US007969513B1

(12) United States Patent
Weber

(10) Patent No.: US 7,969,513 B1
(45) Date of Patent: Jun. 28, 2011

(54) REMOTE CONTROLLER UTILIZING A PROXY ADAPTER TO ENABLE SENDING A PLURALITY OF COMMANDS BY USER ACTUATION OF A SINGLE-BUTTON

(75) Inventor: Harold J. Weber, Centerville, MA (US)

(73) Assignee: Savvystuff Property Trust, Centerville, MA (US)

(*) Notice: Subject to any disclaimer, the term of this patent is extended or adjusted under 35 U.S.C. 154(b) by 1156 days.

(21) Appl. No.: 11/705,782

(22) Filed: Feb. 14, 2007

(51) Int. Cl.
*H04N 5/44* (2006.01)
(52) U.S. Cl. ........................................ 348/734; 348/725
(58) Field of Classification Search .................. 348/734, 348/725; 340/825.72, 825.69, 825.22; *H04N 5/44*
See application file for complete search history.

(56) References Cited

U.S. PATENT DOCUMENTS

| 6,094,239 | A | 7/2000 | Weber | 348/734 |
|---|---|---|---|---|
| 6,396,549 | B1 | 5/2002 | Weber | 348/734 |
| 6,628,344 | B1 | 9/2003 | Weber | 348/734 |
| 6,636,273 | B1 | 10/2003 | Weber | 348/734 |
| 6,661,472 | B2 | 12/2003 | Shintani et al. | 348/732 |
| 6,747,590 | B1 | 6/2004 | Weber | 341/176 |
| 6,757,030 | B2 | 6/2004 | Umeda | 348/734 |
| 6,803,874 | B1 | 10/2004 | Weber | 341/176 |
| 6,970,127 | B2 * | 11/2005 | Rakib | 348/734 |
| 7,012,652 | B1 | 3/2006 | Weber | 348/632 |
| 7,057,673 | B1 | 6/2006 | Weber | 348/734 |
| 7,109,908 | B2 | 9/2006 | Griesau | 341/176 |
| 7,116,264 | B2 | 10/2006 | Griesau | 341/176 |
| 7,154,566 | B2 | 12/2006 | Gustafson | 348/734 |
| 7,821,419 | B2 * | 10/2010 | Hayes et al. | 348/734 |

OTHER PUBLICATIONS

"A TV Remote Control Decoder", Mark Spence, QST-Magazine, Mar. 30, 2004 (www.arrl.org/news/features/2004/03/30/1/).
"TV Channel Guide", Cape Cod Times Supplement, Jan. 28-Feb. 3, 2007 edition.

* cited by examiner

*Primary Examiner* — Sherrie Hsia

(57) ABSTRACT

An appurtenant remote control adapter device suited for application with portable remote controllers commonly used with entertainment equipment including television receptors. The proxy adaptor is configured to intercept a sequence of wireless command signals emitted by the remote control. The intercepted command signals are adapted for temporal storage in a memory. A singular "SEND" command button may be subsequently actuated by a user to urge discharge of the temporarily stored wireless command signal from the memory for forthright translation to a remotely controlled apparatus as a usually singular packetized data burst of wireless signal. The adapter allows a user to leisurely enter individual keystrokes composing the command signal sequence and only then necessarily aim the adapter towards the remotely controlled apparatus with a concurrent singular actuation of the SEND key-button to translate the wireless signal to command the remotely controlled apparatus.

20 Claims, 18 Drawing Sheets

Adelphia Cable System (Falmouth, MA)

| LOCAL STATION | OTA CHANNEL | SURROGATE CHANNEL |
|---|---|---|
| WGBH | 2 | 2 |
| WBZ | 4 | 4 |
| WCVB | 5 | 5 |
| WLNE | 6 | 22 |
| WHDH | 7 | 7 |
| WJAR | 10 | 15 |
| WPRI | 12 | 26 |
| WFXT | 25 | 6 |
| WUNI | 27 | 20 |
| WSBE | 36 | 9 |
| WSBK | 38 | 17 |
| WBGX | 44 | 16 |
| WLVI | 56 | 8 |
| WMFP | 62 | 19 |
| WUTF | 66 | 21 |
| WBPX | 68 | 18 |

Fig. 7-A

Comcast Cable System (Barnstable, MA)

| LOCAL STATION | OTA CHANNEL | SURROGATE CHANNEL |
|---|---|---|
| WGBH | 2 | 2 |
| WBZ | 4 | 4 |
| WCVB | 5 | 5 |
| WLNE | 6 | 6 |
| WHDH | 7 | 7 |
| WJAR | 10 | 10 |
| WPRI | 12 | 12 |
| WFXT | 25 | 13 |
| WSBE | 36 | 20 |
| WSBK | 38 | 14 |
| WBGX | 44 | 16 |
| WLVI | 56 | 11 |
| WUTF | 66 | 67 |
| WBPX | 68 | 15 |

Fig. 7-B

VIRTUAL/SURROGATE Channel Associations

| Network (Station) | ANALOG CHANNEL | DIGITAL CHANNEL |
|---|---|---|
| Hallmark | 21 | 208 |
| ESPN | 49 | 248 |

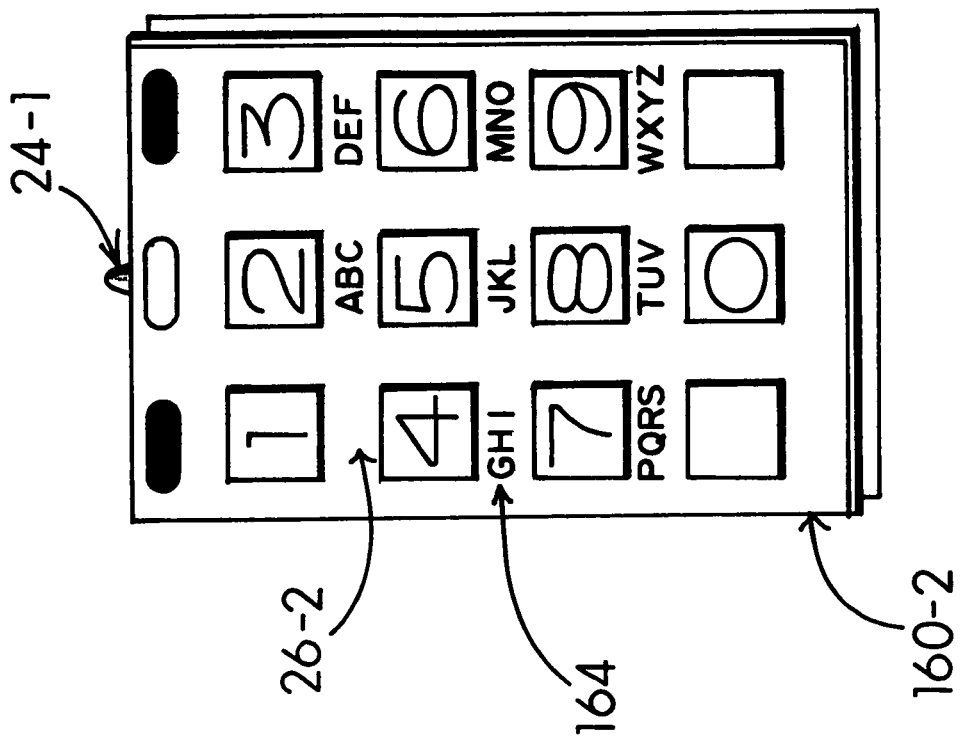
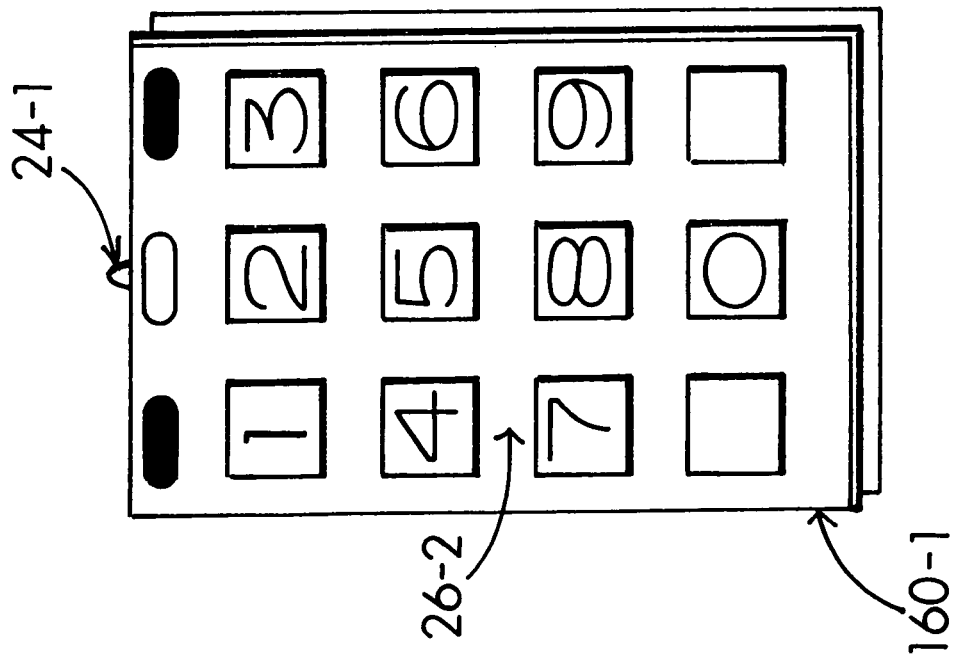

| Adelphia Cable System — Acronym Assignments | | | | (Falmouth, MA) | | | |
|---|---|---|---|---|---|---|---|
| PROVIDER ACRONYM | VIRTUAL CHANNEL | KEYPAD ENTRY ALPHA | KEYPAD ENTRY NUMB | PROVIDER ACRONYM | VIRTUAL CHANNEL | KEYPAD ENTRY ALPHA | KEYPAD ENTRY NUMB |
| AMC | 60 | AMC | 262 | HGTV | 33 | HGTV | 4488 |
| AP | 62 | AP | 26 | HISTory | 55 | HIST | 4478 |
| ARTS | 51 | ARTS | 2787 | HSN | 99 | HSN | 476 |
| BBCA | 109 | BBC | 222 | LIFEtime | 27 | LIFE | 5433 |
| BET | 70 | BET | 238 | MAX (Cinemax) | 24 | MAX | 629 |
| BRAVO | 65 | BRAV | 2728 | MMAX (Moremax) | 271 | MMAX | 6629 |
| CMT | 72 | CMT | 268 | MSNBC | 59 | MSNBC | 67622 |
| CNBC | 58 | CNBC | 2622 | MTV | 75 | MTV | 688 |
| CNN | 50 | CNN | 266 | NECN | 31 | NECN | 6326 |
| CNN-HeadlineNews | 49 | CNNH | 2664 | NESN | 38 | NESN | 6376 |
| COMedy | 52 | COMC | 2662 | NICKelodeon | 48 | NICK | 6425 |
| COURT | 66 | COURT | 26878 | OXYgen | 68 | OXY | 699 |
| CSPAN | 95 | CSPAN | 27726 | SCIFI | 63 | SCIFI | 72434 |
| CSPAN2 | 29 | CSPAN2 | 277262 | SHOWtime | 25 | SHOW | 7469 |
| DIsney | 47 | DIS | 347 | SHOWX | 224 | SHOWX | 74699 |
| DISCovery | 44 | DISC | 3472 | SPEED | 122 | SPEED | 77333 |
| E! Entertainment | 67 | EE | 33 | SPIKE | 46 | SPIKE | 77453 |
| ENCore | 248 | ENC | 362 | STARZ | 241 | STAR | 7827 |
| ESPN | 35 | ESPN | 3776 | SUNDance | 164 | SUND | 7863 |
| ESPN2 | 36 | ESPN2 | 37762 | TBS | 54 | TBS | 827 |
| ESPNClassic | 131 | ESPN3 | 37763 | TCM | 61 | TCM | 826 |
| EWTN | 43 | EWTN | 3986 | TLC | 45 | TLC | 852 |
| FAMily | 42 | FAM | 326 | TMC | 231 | TMC | 862 |
| FNC (Fox News) | 64 | FXN | 396 | TNT | 39 | TNT | 868 |
| FX | 53 | FX | 39 | TOON | 34 | TOON | 8666 |
| FXSports | 37 | FXS | 397 | TRAVel | 71 | TRAV | 8728 |
| GOLF | 121 | GOLF | 4653 | TVFN | 69 | FOOD | 3663 |
| HALLmark | 74 | HALL | 4255 | TWC (weather) | 57 | TWC | 892 |
| HBO | 28 | HBO | 426 | USA | 32 | USA | 872 |
| HBOFamily | 204 | HBOF | 4263 | VH1 | 41 | VH1 | 841 |
| HBOPlus | 202 | HBOP | 4267 | WE (womens) | 140 | WE | 93 |
| HBOSignature | 203 | HBOSG | 4264 | | | | |

Fig. 10

Comcast Cable System — Acronym Assignments (Barnstable, MA)

| PROVIDER ACRONYM | VIRTUAL CHANNEL | KEYPAD ENTRY ALPHA | KEYPAD ENTRY NUMB | PROVIDER ACRONYM | VIRTUAL CHANNEL | KEYPAD ENTRY ALPHA | KEYPAD ENTRY NUMB |
|---|---|---|---|---|---|---|---|
| AMC | 59 | AMC | 262 | HISTory | 58 | HIST | 4478 |
| AP | 63 | AP | 26 | HSN | 70 | HSN | 476 |
| ARTS | 37 | ARTS | 2787 | LIFEtime | 36 | LIFE | 5433 |
| BBCA | 241 | BBC | 222 | MAX (Cinemax) | 341 | MAX | 629 |
| BRAVO | 57 | BRAV | 2728 | MMAX (Moremax) | 342 | MMAX | 6629 |
| CMT | 66 | CMT | 268 | MSNBC | 40 | MSNBC | 67622 |
| CNBC | 46 | CNBC | 2622 | MTV | 28 | MTV | 688 |
| CNN | 42 | CNN | 266 | NECN | 8 | NECN | 6326 |
| CNN-HeadlineNews | 43 | CNNH | 2664 | NESN | 51 | NESN | 6376 |
| COMedy | 61 | COMC | 2662 | NICKelodeon | 25 | NICK | 6425 |
| COURT | 27 | COURT | 26878 | OXYgen | 216 | OXY | 699 |
| CSPAN | 44 | CSPAN | 27726 | SCIFI | 62 | SCIFI | 72434 |
| CSPAN2 | 45 | CSPAN2 | 277262 | SHOWtime | 361 | SHOW | 7469 |
| DISney | 24 | DIS | 347 | SHOWX | 364 | SHOWX | 74699 |
| DISCovery | 39 | DISC | 3472 | SPEED | 250 | SPEED | 77333 |
| E! Entertainment | 34 | EE | 33 | SPIKE | 55 | SPIKE | 77453 |
| ENCore | 326 | ENC | 362 | STARZ | 321 | STAR | 7827 |
| ESPN | 49 | ESPN | 3776 | SUNDance | 201 | SUND | 7863 |
| ESPN2 | 50 | ESPN2 | 37762 | TBS | 31 | TBS | 827 |
| ESPNClassic | 48 | ESPN3 | 37763 | TCM | 213 | TCM | 826 |
| EWTN | 56 | EWTN | 3986 | TLC | 38 | TLC | 852 |
| FAMily | 26 | FAM | 326 | TMC | 381 | TMC | 862 |
| FNC (Fox News) | 41 | FXN | 396 | TNT | 33 | TNT | 868 |
| FX | 30 | FX | 39 | TOON | 60 | TOON | 8666 |
| FXSPorts | 52 | FXS | 397 | TRAVel | 54 | TRAV | 8728 |
| GOLF | 53 | GOLF | 4653 | TVFN | 67 | FOOD | 3663 |
| HALLmark | 21 | HALL | 4255 | TWC (weather) | 47 | TWC | 892 |
| HBO | 301 | HBO | 426 | USA | 35 | USA | 872 |
| HBOFamily | 304 | HBOF | 4263 | VH1 | 29 | VH1 | 841 |
| HBOPlus | 302 | HBOP | 4267 | WE (womens) | 215 | WE | 93 |
| HBOSignature | 303 | HBOSG | 4264 | | | | |
| HGTV | 32 | HGTV | 4488 | | | | |

Fig. 11

REMOTE CONTROLLER UTILIZING A PROXY ADAPTER TO ENABLE SENDING A PLURALITY OF COMMANDS BY USER ACTUATION OF A SINGLE-BUTTON

FIELD OF INVENTION

My invention generally pertains to a portable, hand-held remote controller generally utilized with television receivers, video recorders, cable and satellite receptors, DVD players and similar entertainment equipment, including home theater apparatus. My invention further relates to providing simplified usage of a remote controller by enabling leisurely entry of several command keystrokes, followed by a sending of the accumulated keystrokes as a packet of data signals initiated by merely pressing one SEND button. More particularly my invention resides in the field of being an after-market accessory applicable for use with a remote control of conventional manufacture.

SYNOPSIS

In my invention's operating scenario, a remote controller is utilized to command a sequence of usually several differing actions associated with a remotely controlled apparatus. Often such commands require a plurality of keypad entries while the remote controller is held so as to be "aimed-at" the controlled equipment. For example, a sequence of commands may merely be two or three keybutton entries that make-up a two or three digit channel selection number.

My apparatus embodiment presently acts as a proxy device that clutches the structure of an ordinary remote controller. It's purpose is to intercept and data-store the individual keystroke sendings issued by the remote controller that represent a plurality of key-button entries. The stored-data is later read-out and consolidated into a composite sending of the individual key-button instructions as an action requiring only a single "SEND" button actuation while the remote controller is only then necessarily aimed-at the remotely controlled apparatus.

BACKGROUND OVERVIEW

My invention affords a superior degree of convenience and error-resistant operation of an ordinary remote control by ordinary users. It is not unusual for user's to experience difficulty and confusion while trying to use the type of remote control ubiquitously included with virtually every television receiver, cable box or satellite receiver. The main problem encountered by ordinary mortals who attempt using the typical remote control is the understanding of which button to push without "looking at" the keypad. More central to the problem is the necessity for maintaining an "aiming" of the remote control "at the to-be-controlled" apparatus. In other words, to change channels from (for example) channel 41 to channel 301 requires the entry of three keypunches, 3 plus 0 plus 1, in that order and quickly, lest the device time-out and the user has to start all over again. Convenient, error free remote control usage is further confounded by the smallness of a typical modern remote controller's layout. While it is true that there are special editions of remote controls available, these devices usually sacrifice some if not many of the functions found on the OEM remote control. Therefore, they are not necessarily useful for every situation.

In another U.S. Pat. No. 6,094,239 I teach a solution to a similar scenario. As my '239 patent says: "Individual keybutton entries are temporarily stored until the entry sequence is complete." It continues with: "When the entry sequence is completed the remote controller is then aimed at a remoteely controlled television set . . . " and further says: "The user initiates a SEND command and the stored entries are retrieved and transmitted from the remote controller device to the receptor of the remotely controlled device as a packet of data which acts to change channel selection or accomplish other tasks in the remotely controlled device." In other words, the user enters the necessary command steps while conveniently viewing the keypad and once all the entries are submitted, the user presses a single key which translates the command data as a composite packet of instructions to the remotely controlled device.

Later, in U.S. Pat. No. 6,803,874 I also show how the sequence of entries may be stored, converted into an alternate command option sent as a composite packet of command data to the remotely controlled device.

More recently in U.S. Pat. No. 7,057,673 I show the entry of a network acronym into the pseudo-alpha-numerical keypad (similar to that used with a telephone) that converts the acronym into an appropriate channel number (or other command) before being sent as a composite data packet by actuation of a single SEND key command.

BENEFITS OF INVENTION

The main goal and hence the main benefit to an ordinary user of my invention pertains to a capability for utilizing the original equipment maker's (OEM's) remote controller, rather than obtaining a special remote controller incorporating similar features as taught in my earlier several patents. This capability for utilizing the advantages of prior-art remote controls is attained by configuring this invention as an adapter which is affixed to or otherwise associated with the OEM's remote control. The result of the adapter's adjunction provides for casual operation of the "ordinary" remote control by even the most persnickety or technophobic user.

Many entertainment device's have full-featured remote controls that serve best for addressing all of the controlled apparatus' features. Clearly "Universal Remote Controls" often disappoint a user by failing to include one or more important features. Therefore it is of benefit to be able to use the equipment maker's original remote control to retain some forfeited features.

An aiming of the original remote control "at" the television set, cable box or other controlled device is mandatory while the keybuttons are individually pressed. Aside from having a remote control inclusive of the teachings of my U.S. Pat. No. 6,094,239, the user has no capability for temporarily entering a string of keybutton actions and then sending them to the controlled device as a data packet neatly comprising the string of the several individual entries.

My device affixes to an ordinary remote control and extends it's feature set to include storing a string of entries and then sending them as a packetized string of data.

PROBLEMS SOLVED BY INVENTION

A standard remote control requires a user to "aim" the remote "at the television set" while entering keybutton selections. At best this is inconvenient and difficult, at worst it simply can't be done by someone who is enfeebled (e.g., elderly or physically challenged). I realized that while I had previously taught relaxed keybutton entry and a "one button sending" of an accumulated sequence of entries, the practice necessitated a new remote control inclusive of these earlier capabilities. This teaching appears in my U.S. Pat. No. 6,094, 239 but remained inapplicable to existing prior-art conventional remote controls.

I have further realized that often, with popular entertainment equipment, no other remote works better than the one that came with the equipment itself. Hence, I concluded that what the ordinary user needs is an adapter which can be affixed to the standard remote control and upgrade it to offer the advantages of single-button sending and allowing leisurely entry of keybutton commands.

I also see where a bedridden person or wheelchair occupant may not be able to make satisfactory keybutton entries in a rapid-fire sequence quickly enough to prevent the controlled apparatus from simply "timing out", necessitating starting all over again.

Additionally also observed that many "senior citizens" find ordinary remote controls difficult to use. Aside from the teensy keybuttons, a senior experiencing encumbering senility has a hard-enough time "finding the buttons", let alone punching them quickly enough and in the proper sequence. My invention is aimed at this problem in that the entries may be made slowly and over an extended period of time, then sent with the mere pressing of one SEND keybutton.

I also found that an elderly person (or even an younger person) may experience arthritis making rapid-fire keybutton nearly impossible. Furthermore, I encountered senior persons who simply had a tremulous affliction and the resulting quaver made quick and accurate keybutton selections nigh impossible. While my earlier U.S. Pat. No. 6,094,239 recognized the disadvantage of tremors and other physical or mental maladies, the patent's teachings said little about accommodating pre-existing remote controls to assuage the attendant operational problems.

SUMMARY OF INVENTION

A new level of convenience is afforded the user of a remote controller which includes an adjunction of the novel adapter of this invention. A casual user may enter several keystrokes into the keypad of a remote control to change channels, or perform other functions. Such entries may be made one-at-a-time, slowly or quickly, while holding the usual remote control in an easily viewed position or location, even in another room. Once the entries are made, the remote control and proxy adapter are held-up and "aimed" at the television set or other apparatus. Pressing a single "SEND" button launches a packet of data representing a sequence of the individual keystroke entries. Extensively, the adapter may, by itself be aimed at the television set and commanded by pressing the "SEND" button. I anticipate that entries may be made at a user's convenience and then the SEND button may also be pressed at the user's convenience. This time-independence allows early-on entry of a command, such as a channel-change, during waste time such as a commercial. Then when the channel is desired to be changed, such as at the end of a current program, merely pressing the SEND button moves the channel selection to the new choice.

A primary advantage of my teaching's embodiment is to enable full use of an OEM-supplied remote control with the advantageous convenience of single-button sending of a sequence of keystroke entries. By individual entry, I mean that the individual keystrokes may be made randomly, even minutes apart, without concern that the television set or remotely controlled device will "time-out" while the user leisurely picks-out individual keystrokes. Clearly this is an asset for disadvantaged users suffering from eyesight issues, arthritic fingers, confusion from advancing age or else from being merely technophobic in their ability to manage keeping an ordinary remote control "aimed-at" the television set while keystroke entries are accurately located and submitted.

I define several variant combinations of an ordinary remote control and my proxy adapter which can cover a diversity of user environment needs.

MODE 1 EXAMPLE

My device is configured as an adapter that attaches to an existing remote control, having a receptor intercepting the infra-red light pulses ordinarily sent to the remotely controlled equipment. The light pulse pattern is stored in a memory and then rapidly read-out and translated to the remotely controlled equipment as a rapid-fire packetized sequence of command instructions for channel change or otherwise intended action.

MODE 2 EXAMPLE

My device is configured as a free standing adapter which a user can aim the OEM controller "into" and store the pattern of infra-red light pulses as a memory pattern which can be read-out in rapid-fire succession when a SEND button is pressed. The freestanding adapter is in effect a "docking station" for the OEM remote controller.

MODE 3 EXAMPLE

My adapter is configured to allow the user to enter "real" channel numbers, whereas the adapter performs a conversion and sends a "surrogate" channel number to the remotely controlled television receiving, cable box or satellite receiver apparatus.

MODE 4 EXAMPLE

My adapter is further configured to enable a temporal programming of a number of different keystroke sequences which may later be independently used. For example, if an evening's programming includes watching channel 29, followed by channel 167 and later-on changing to channel 407, each of the desired keystroke combinations may be entered early-on in the evening. Then the appropriate SEND button is pressed and the associated channel change instruction change is sent-on to the television receiver as a data packet. This is of particular advantage for use by an elderly or physically challenged person, because a care-giver could potentially set-up an evening's duration of televiewing selections and the disadvantaged user could change programming as need-be.

What this Invention "is" and "is-not"

This invention "is not" about an OEM remote controller device, such as ordinarily provided by an equipment maker. Furthermore it is not about an OEM supplied remote controller re-engineered to include any of the features of my earlier inventions so as to further the convenience and suitability of application with the OEM's equipment.

Furthermore, this invention "is not" about utilizing a macro procedure to store-up several instructions and then sending them when the macro entries have been completed. A macro is generally applicable to pre-planned events, such as sequencing an entertainment system. Generally macro application is not suitable for the kind of random, one-time events for which my invention scores with a user's needs. Mainly macros are not applicable because they have to be pre-programmed and necessitate an entry procedure ofttimes more confusing than the immediate task justifies.

This invention "is" about a coactive apparatus which associates with an OEM's remote control by grabbing infra-red light pulses emitted by the OEM's controller and re-processing them so that the resulting signal structure may be suitable for reformatting and sending to the remotely controlled apparatus as a data packet of sequential command instructions. The invention is about allowing the single-button actuation of a command instruction that begins the wireless translation of the data packet to the remotely controlled apparatus. This invention is about the adapter being an accessory device adjunctively associated with the OEM's ordinary remote control to benefit the user with enhanced suitability for the intended remote control application, particularly when the primary user is functionally disadvantaged or merely somewhat technophobic. It is also about converting the format of the OEM sender into an alternate format better suited for performing the immediate task. For example, entering a channel 38 over-the-air channel number may result in sending a channel 16 command to a cable box or the like.

OBJECTIVES OF INVENTION

An objective of my invention is to adapt an ordinary OEM's remote control to have improved convenience.

A purpose of my invention is to allow single button actuation for the onset of a sequence of earlier-entered command events.

A gist of my invention is to allow entry of channel change instructions in a leisurely and un-paced manner.

A key purpose for my invention is to allow entry of a sequence of several keystroke instructions without a necessity for aiming a remote controller at a remotely controlled television receiver or the like while keystroking the entries.

The spirit of my invention is to remove time constraints on the rapidity of individual keystroke entries to avoid "time-out" of the associated remotely controlled apparatus.

A further goal is to provide for the capability of incorporating this invention's novel solution into the rather routine operation of a conventional remote control by means of a docking station that can be set-up to temporarily receive and store several command instructions and subsequently read-out and translate the instructions to a remotely controlled apparatus upon singular actuation of a SEND button or the like.

It is an important intent to provide a single SEND button for a user to actuate that can promptly submit a packetized sequence of several command instructions originated from an ordinary OEM's remote control device.

The essence of my invention is to provide an inexpensive new level of user convenience for a common problem that involves an inability to effectively operate an OEM's remote control without intra-stroke timeout, user confusion or aggravation that may thwart a user's ability to change television channels or otherwise command the functions of an entertainment apparatus.

It is a further intent to provide a method for attaching a portable device to an OEM's remote controller that may coactively intercept and convert the usual infra-red signal pulses into temporarily storable data which may subsequently be read-out and re-translated to the remotely controlled apparatus as a burst-like data packet of command signals to achieve channel-change or other control functions in an entertainment apparatus, such as a television set, cable-box, satellite receiver, home entertainment center or home theater.

Additionally my invention finds suitability for adjunctively working with any number of remote controllers on a shared basis so as to enable a composite sending of a complex sequence of commands to several entertainment apparatus' with but the single press of the SEND button.

My invention intends that a user may find better usability and satisfaction of an entertainment apparatus by freeing-up the constraints of ordinary OEM or "universal" remote controls in regards to rapidity of making a series of related keystroke entries, such as several numbers needed to achieve a channel change.

DESCRIPTION OF DRAWINGS

My invention is depicted by 00 sheets of drawings showing 00 figures, including:

FIG. 7—A chart showing relationship between over-the-air (broadcast) channel numbers and surrogate channel numbers encountered on cable or satellite receivers.

FIG. 9A—A numerical keypad arrangement.

FIG. 9B—An overlay provides ALPHA-character entry provisions with the numerical keypad arrangement of FIG. 9A.

FIG. 10—A chart showing an association between provider acronyms and channel numbers in an Adelphia cable system.

FIG. 11—A chart showing the association between provider acronyms and channel numbers in a Comcast cable system.

DESCRIPTION OF INVENTION

Figure 1:
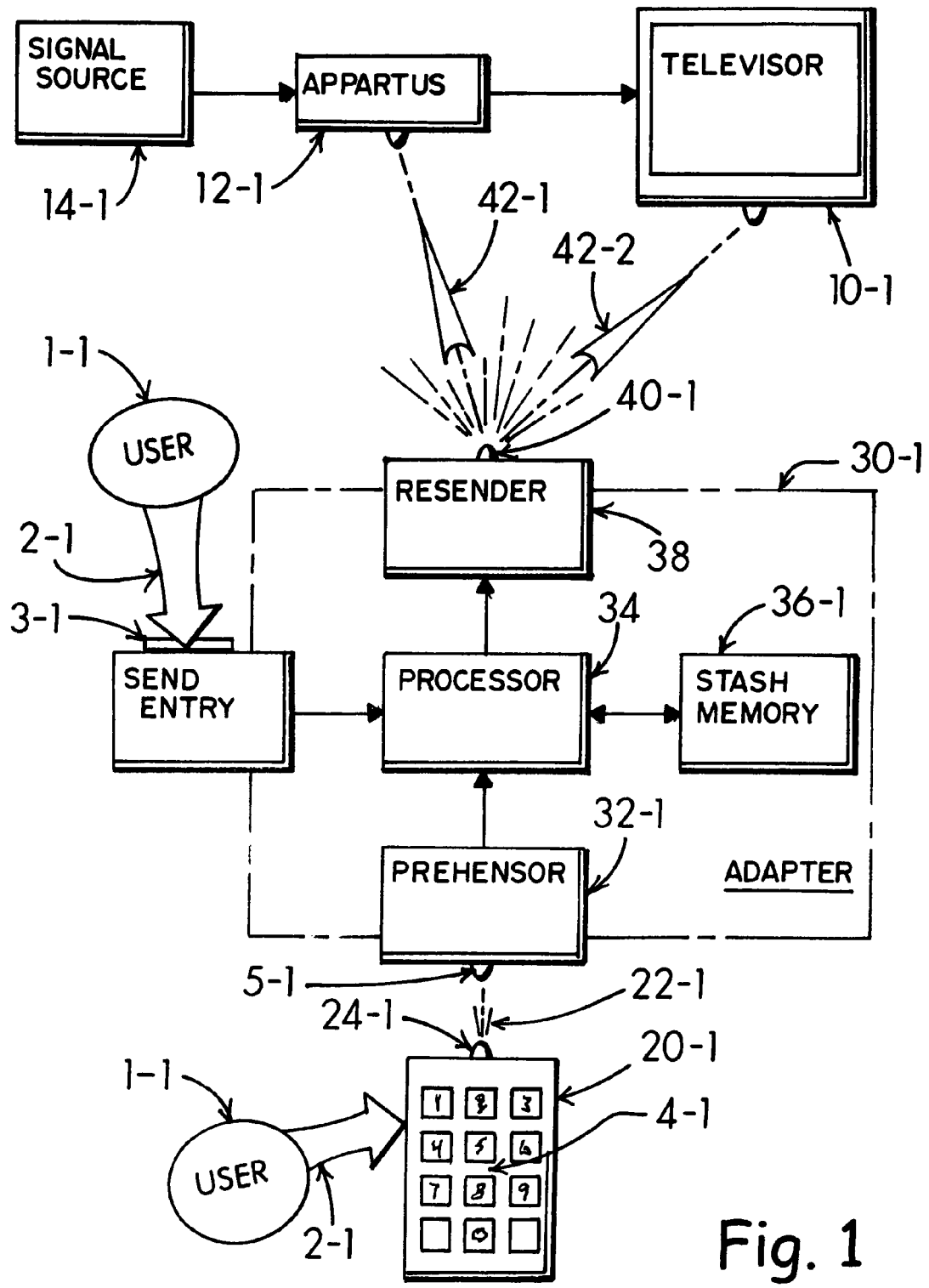
FIG. 1—An overall functional diagram showing my proxy adapter 30-1 in conjunction with an ordinary remote control 20-1 and a remotely controlled apparatus 10-1,12-1.

An ordinary remote control 20-1 may be operated by a user 1-1 using key-buttons included on the device's keypad 4-1. A user's actuation of individual keybuttons results in a series of encoded wireless (infra-red light) signals 22-1 emitted from the radiator, e.g. an IRLED 24-1. These encoded signals impinge on a receptor device 5-1 associated with prehensor 32-1 of FIG. 1. The prehensor functions to adapt intercepted wireless command signals into command data signals coupled with processor 34. The processor promptly routes the applied command data signals for temporal storage in stash (cache) memory 36-1. Under ordinary circumstances, the user 1-1 submits several numerical key selections (for example channel "279") with random time spacing between entries. Prior to this invention, ordinary remote controls must be operated in a timely manner. That is to say, each digit of a sequence (e.g., "279") must be quickly entered. If not, the remotely controlled device "times-out" and the user has to start all-over again with the entries. By storing the entries in the STASH memory 36-1, the user is freed from concern of time-out and can be quite leisurely in sequencing the entries.

Once the several entries are made, the user 1-1 may next actuate 2-1 a unique SEND keybutton 3-1 which instructs the processor to retrieve the stored command data signals stored in the STASH memory and sequentially route the signals to a resender 38. The resender formats the data signals for producing a wireless command emission 40-1 which is routed 42-1 to a signal tuning apparatus 12-1, such as a cable box, satellite receiver, VCR, DVD/VDR or "TiVo™ box" device.

Figure 2:
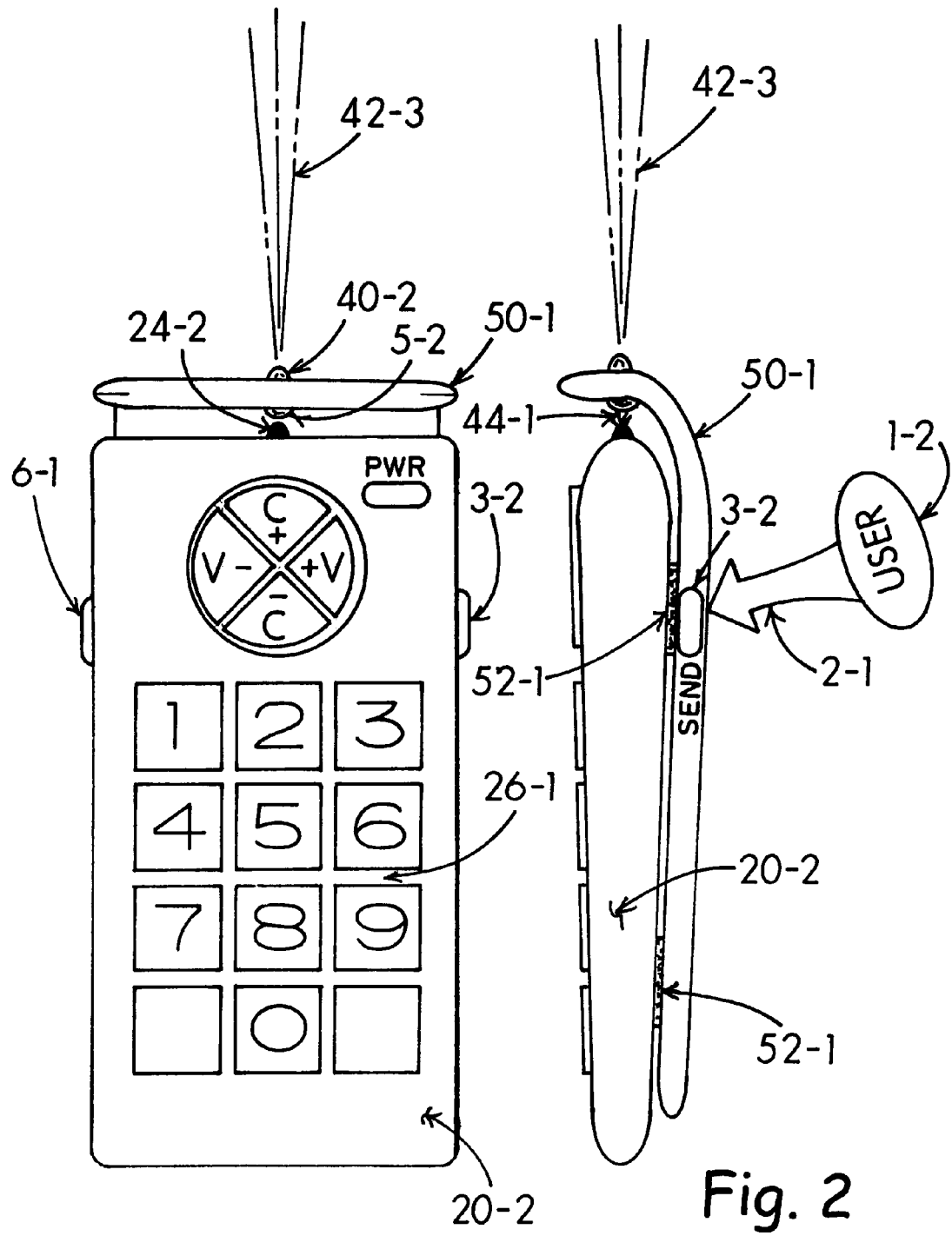
FIG. 2—A generalized arrangement for my invention as an adapter combined with an ordinary remote controller.

What is further depicted is a sending of an automatic sending of a preset selection value 42-2 substantially concurrent with the translation of the wireless command emission. The intent of this preset selection is to reassert necessitous input selection in the televisor 10-1. Usually this means a setting of the televisor to an intermediate interlink Channel 3 or Channel 4, or else selecting an INPUT 1 option, for example. This reassertion serves to unequivocally maintain the necessitous intermediate signal compatibility between the televisor 10-1 and the accessory device 12-1 every time the user submits a channel selection change or other command 42-1 to the accessory apparatus 12-1. My previous U.S. Pat. No. 6,628,344 expands on this advantageous operation, albeit the earlier patent is silent in regards to it's application as an adapter 50-1 coupled with a quite ordinary, standard remote control as shown in FIG. 2.

The adapter 50-1 is fastened-to an ordinary remote control 20-2 illustratively by using hook-and-loop fastener strips 52-1 such as Velcro™. In this depiction the ordinary remote control 20-2 is physically engulfed by the adapter's embodiment. A keypad 26-1 on the ordinary remote control allows a user 1-2 to submit multi-digit channel number entries. Each of the sequence of several entries are emitted by an IRLED 24-2 on the front of the remote control and exclusively coupled 44-1 to a receptor 5-2 on the adapter 50-1 for intercepting and processing command data signals in accord with the teachings of this invention. When several entries have been satisfactorily entered and stored in the stash memory 36-1, the user 1-2 may elicit reading and sending the stashed commands by pressing the SEND keybutton 3-2. As a result, the sequence of command data retrieved from the stash memory 36-1 is promptly urged forth through an IRLED 40-2 from the adapter 50-1 as a wireless signal 42-3 for collection by the attendant controlled apparatus 12-1.

Figure 3:
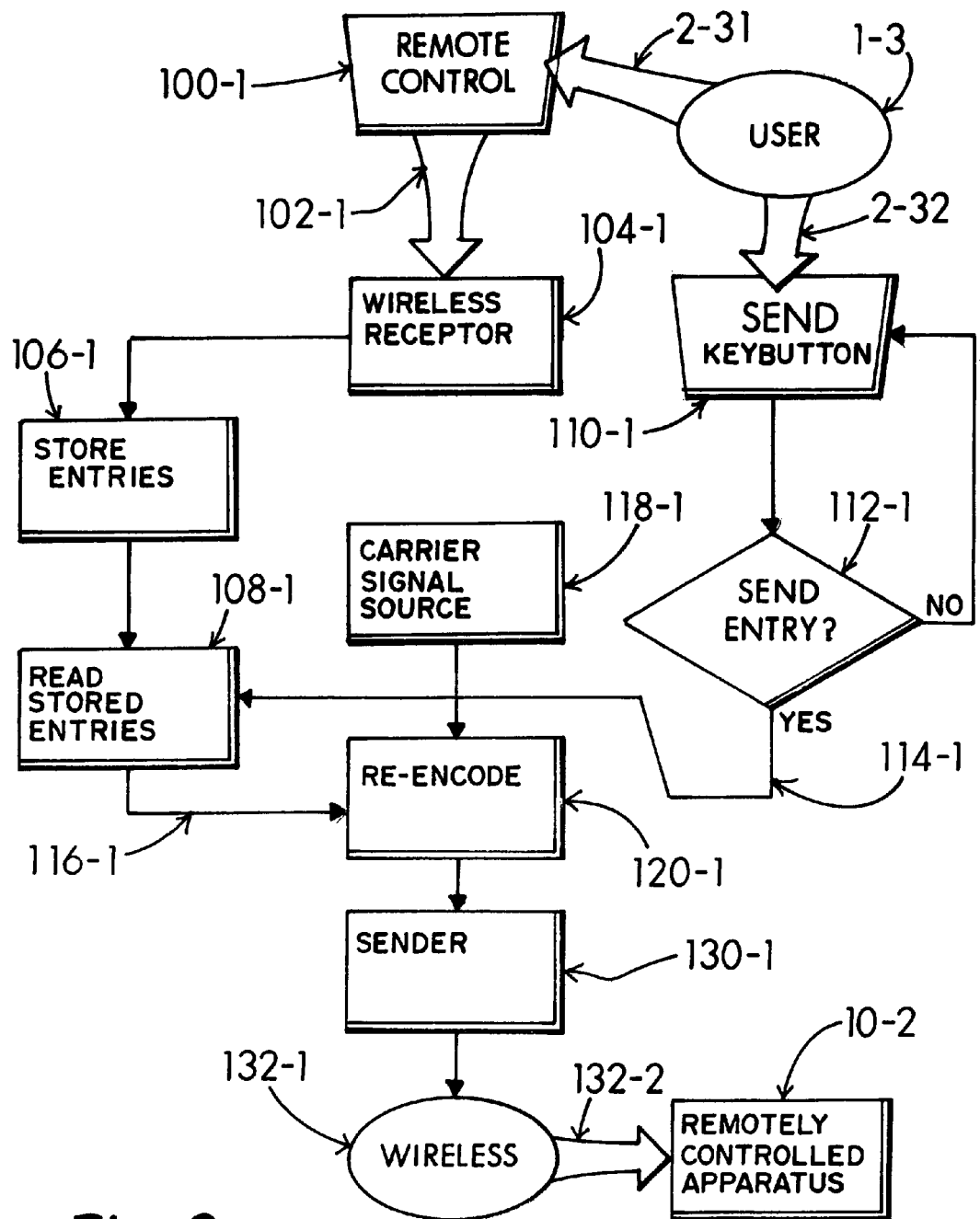
FIG. 3—A process chart showing decisive associations for an illustrative example of my proxy adapter.

I show an ordinary remote control 100-1 operated 2-31 by an user 1-3 in FIG. 3. The remote control sends a wireless (usually infra-red) command signal 102-1 for each keypad entry that is intercepted by a wireless receptor 104-1 and subsequently stored 106-1.

When several entries have been submitted 2-31 by the user 1-3, the user may presently operate 2-32 a SEND keybutton 110-1. A decisor 112-1 upon finding keybutton activation produces a YES signal 114-1 that couples with the read stored entries function 108-1. As an immediate result, the stored 106-1 command data is retrieved and routed 116-1 to a re-encode function 120. This serves to modulate a (ofttimes about 38-KHz) carrier signal 118-1 to urge a sender 130-1 to deliver a wireless signal 132-1 as a rapid-fire rendition of the stored command data which are reflective of the keybutton entry sequence earlier submitted 2-31 at a leisurely pace by the user 1-3.

Figure 4:
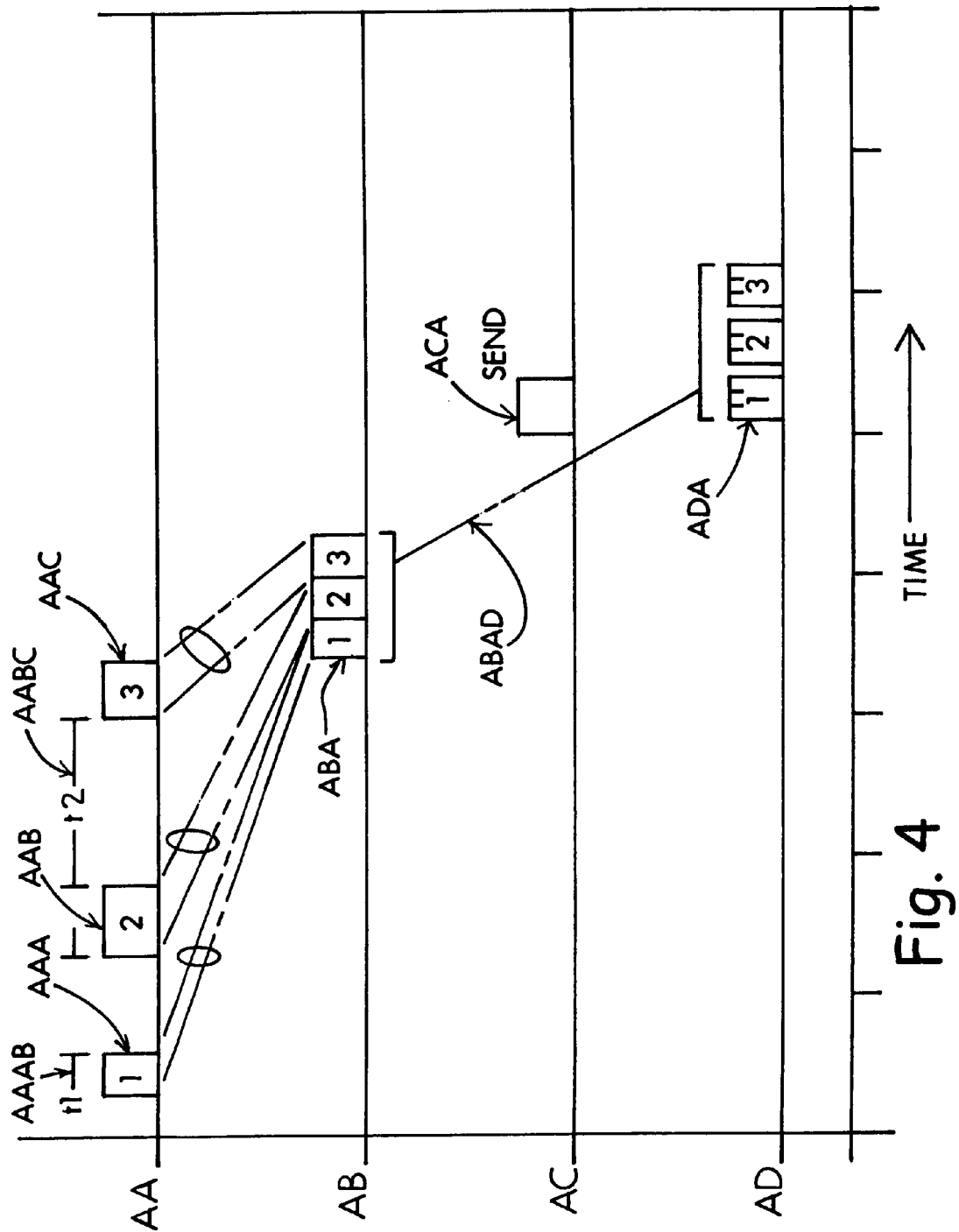
FIG. 4—A graphical representation for my adapter's functions.

A graphical presentation of FIG. 4 shows the succession of user 1-3 keybutton entries as AAA, AAB, AAC for an entry sequence of 1-2-3, shown for example. This showing is important in that the time t1 elapsed AAAB between the first entry AAA and second entry AAB may be quite extensively different from an elapse AABC of time t2 that may occur between the subsequent entry AAC relative with the preceding entry AAB. Each entry is routed into the stash memory and held in association ABA. When the user 1-3 enters a SEND command ACA (2-32 of FIG. 3) the readout of the stored data ABA is enabled ABAD and presented as a wireless signal sequence ADA having a metred translation pattern ADA.

Figure 5:
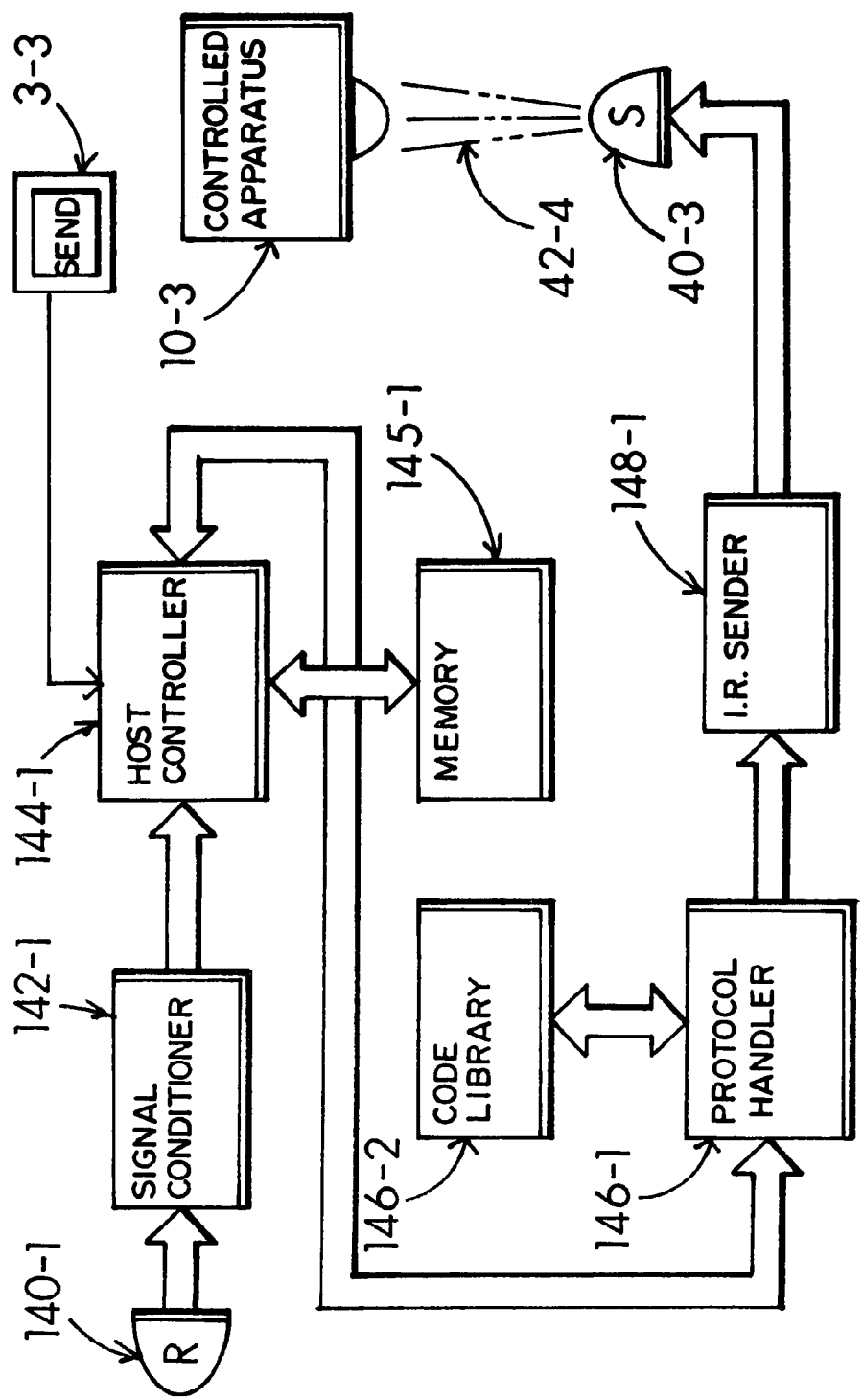
FIG. 5—A variation of my invention involving restructure of the remote control protocol.

A wireless infra-red beam of data-signal bearing energy is intercepted by a receptor 140-1 in FIG. 5. The wireless beam is ordinarily originated from a proprietary or universal remote control lacking the advantageous benefits of this invention. The data-signal is amplified and otherwise conditioned 142-1 into a data bearing digital signal coupled with a host controller 144-1. The host controller's operative contribution includes a memory 144-2 ("stash memory") and a SEND keybutton 3-3. Initially, the incoming data-stream delivered by the signal conditioner is temporarily stored in the stash memory 144-2, while maintaining it's original data weight. When the user completes a sequence of entries using the ordinary remote control 20-2, the user may actuate the SEND keybutton 3-3. This initiates a retrieval of the data stored in the stash memory 144-2 to be delivered to a protocol handler 146-1. The intent of the protocol handler is to associate the retrieved data with a coding pattern concurrently retrieved from a code library 146-2. This enables the resulting data signal delivered to the I.R. Sender 148-1 to convey encoded commands via the IRLED wireless sender 40-3 as a command beam of data 42-4 for interception and interpretation by the controlled apparatus 10-3.

Figure 6:
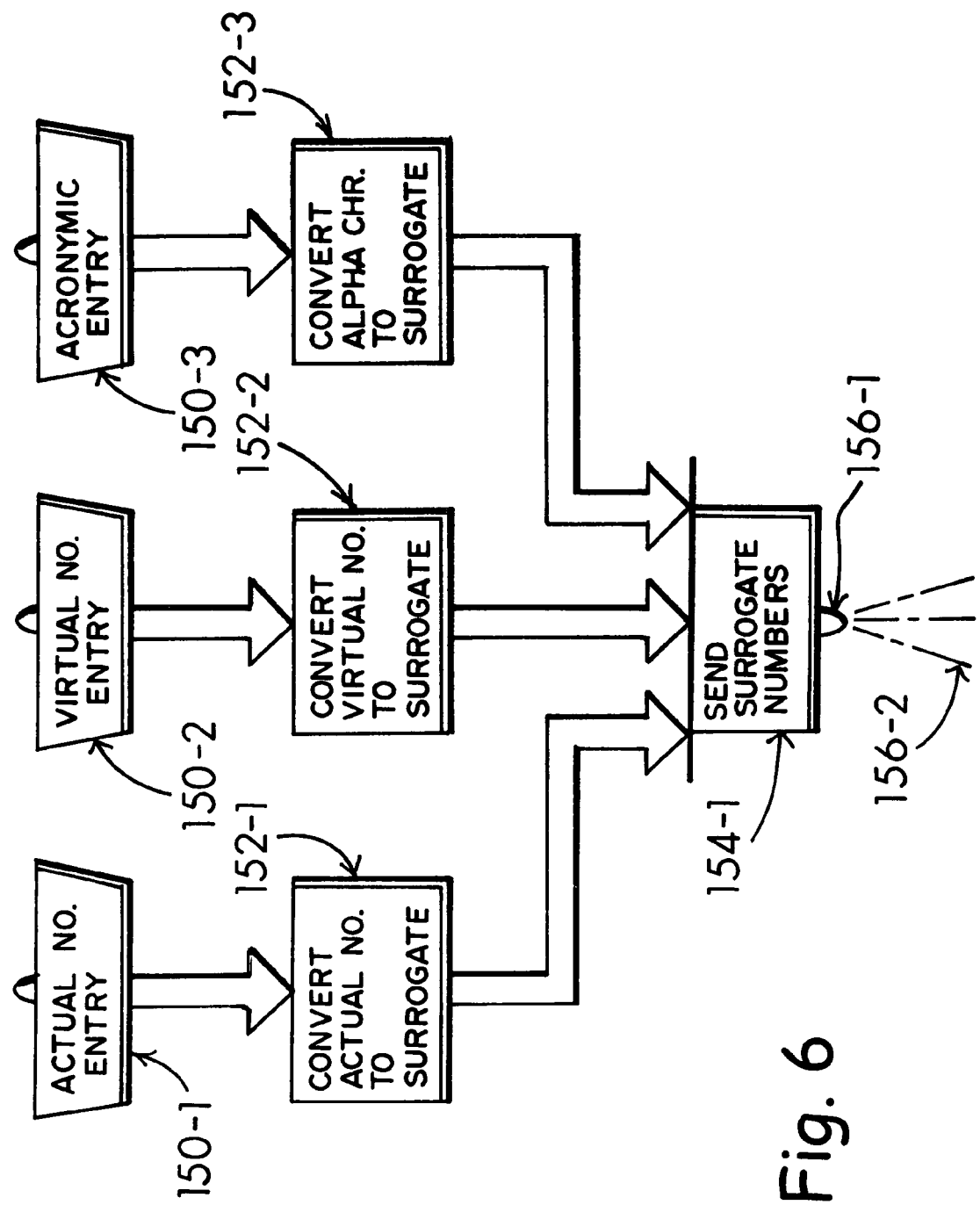
FIG. 6—A diagram showing a conversion of an actual, virtual or acronymical input entry into a surrogate channel number.

Advancing to FIG. 6 shows several combinative combinations which may result in sending a surrogative command to the controlled apparatus 10-3. An actual number (or "over the air" channel number) entry 150-1 may convert from the actual to the surrogate number 152-1 for advancement to the surrogate number sender 154 and IRLED 156-1 for wireless translation 156-2 to the controlled apparatus. Review FIG. 7 to get a grasp on the difference between a real OTA (over the air) and a surrogate channel. For example FIG. 7-A shows how Adelphia Cable System (Falmouth, Mass.) changes the OTA channel number into a surrogate number on many of the OTA-originative programmings. Take OTA channel 6 WLNE, which is changed to surrogate channel 22, while OTA channel 10 WJAR changes to channel 15 and similarly OTA channel 12 changes to surrogate channel 26.

Similarly FIG. 7-B depicts the OTA to surrogate channel changes introduced by Comcast Cable Systems (Barnstable, Mass.) where OTA channel 25 WFXT changes to surrogate channel 13 and OTA channel 56 WLVI changes to surrogate channel 17. It is obvious that a person using an ordinary remote control alone is quickly confused by this mutation of channel numbers between OTA and surrogate values. This invention's intent is to correct this by way of the actual to surrogate conversion function 152-1 of FIG. 6.

Yet another conversion affords convenience to a user. By accepting a virtual channel entry 150-2 keyed into a standard remote controller, the virtual channel number entry may be converted 152-2 into the surrogate channel for sending to the remotely controlled apparatus. This type of translation is most useful where a mix of analog and digital channels are utilized in the same household. For example, if the primary televisor is equipped to receive digital broadcasts and an elsewhere located televisor is equipped to merely receive analog broadcasts, the channel numbers will be decidedly different FIG. 7-C for some of the selections. For example, while a user may watch the Hallmark's analog channel 21 on a "cable-ready" televisor, the same user when using a televisor having a digital-cable converter may prefer watching it on the parallel digital channel 208. The conversion 152-2 allows the user to continue to select channel 21 as the preferred channel and it is converted to channel 208 before sending 154 to the controlled apparatus 12-1.

Figure 8:
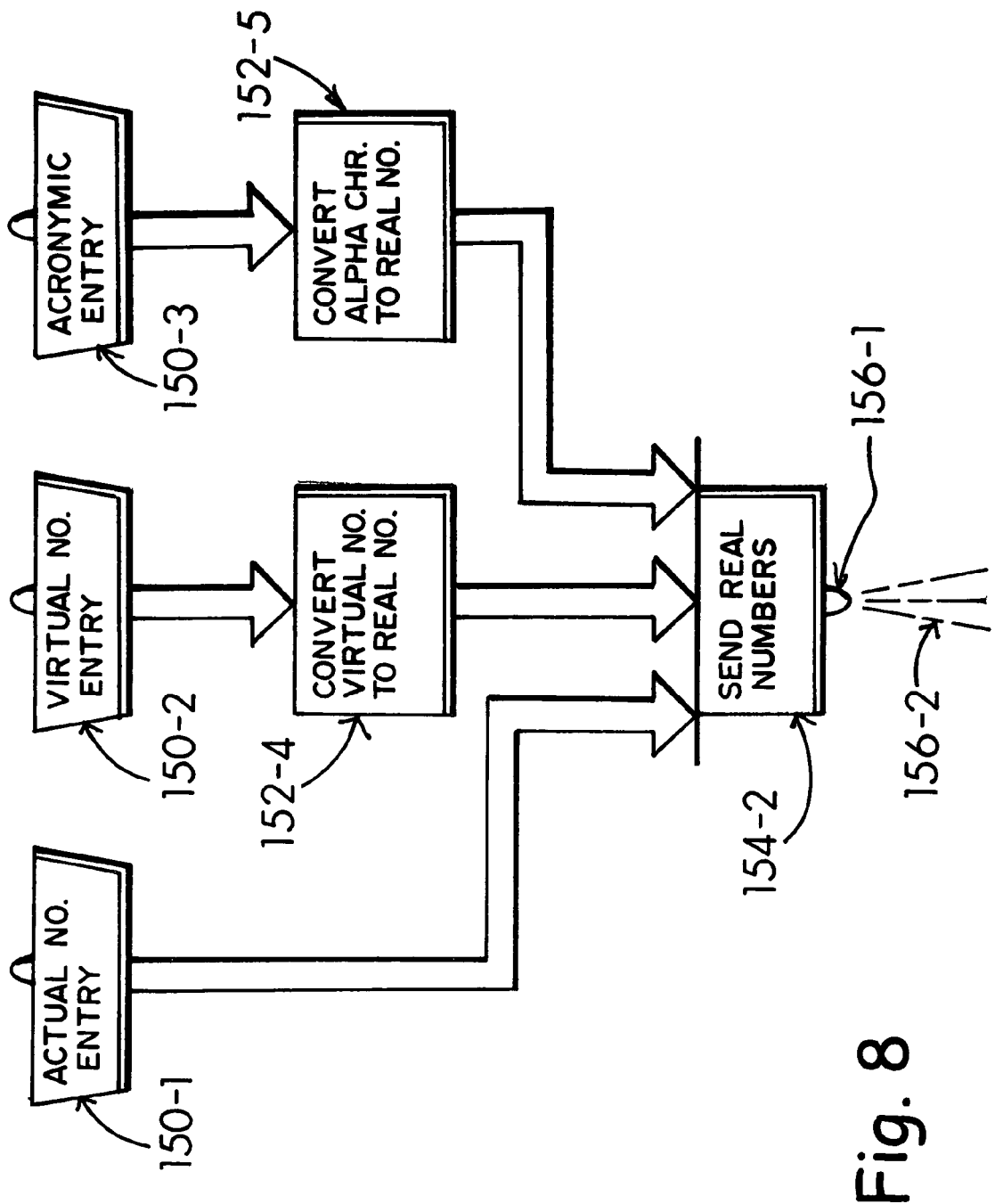
FIG. 8—A diagram showing a conversion of an actual, virtual or acronymical input entry into a real channel number.

In FIG. 8 I show several combinative events which may result in sending a real-number command to the controlled apparatus 10-3. For example an actual channel number may be entered 150-1 from the intercepted sending of the universal remote control 160-1 keypad 26-2 shown in FIG. 9-A. Entry of a channel number 10 selection results in a sending 154 of a "Channel 10" encoded wireless signal 156-2 to the controlled apparatus 12-1. I also show the allowable entry of the virtual channel entry 150-2 for channel 11 to convert 152-4 and otherwise command the televisor with a "channel 56" call 156-2.

More uniquely I depict the ability to convert network acronyms and station call-letter assignments (such as WGBH) directly into channel assignments. When an acronym is entered 150-3 utilizing a standard remote control with an alphanumeric overlay such as depicted in FIG. 9-B, the entry is converted 152-5 into an assigned channel number as depicted by FIG. 10 for an Adelphia™ cable TV system and in FIG. 11 for a Comcast™ cable TV system.

From the Adelphia™ chart of FIG. 10, find that a keypad entry of "CNN" is obtained by pressing the keys 266 on the standard remote control, followed by the SEND command on the adapter. Bingo! The adapter sends a channel 50 selection to the controlled apparatus or cable-ready televisor.

In a similar way from the Comcast™ chart of FIG. 11, find that the keypad entry of "DISC" is obtained by pressing the keys 3472 on the standard remote control, again followed by the SEND command on the adapter. Viola! The adapter sends a channel 39 command to the controlled apparatus or cable-ready televisor.

Note that the keypad 26-2 of the standard remote control 160-2 of FIG. 9-B is merely modified by providing an overlay ascribing alpha merit to each of the numeric buttons. This depiction follows the alpha-numerical assignments characteristic of an ordinary TouchTone™ telephone keypad, although other layout arrangements might be used by a practitioner of this invention. This adaptation of an acronymic input into a channel number sending is expressly explained in detail in my U.S. Pat. No. 7,057,673 although the patent is silent in regards to finding acronymic to numerical conversion by way of an external adapter, which is the central object of this invention.

Figure 12:
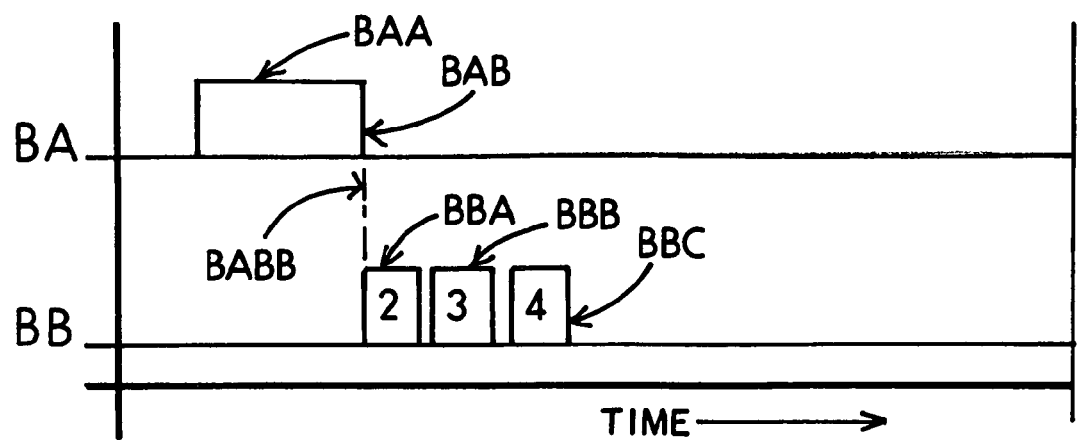
FIG. 12—A graph showing a retained holdment of the SEND key allows the sending of the command signals when the SEND key is released.

Sending the stored-data command is initiated by utilizing a SEND button 3-1 on my adapter. Advantage is obtained if the actual SEND command is not initiated until the SEND button is released. This allows the user to press the SEND button and "hold it down" while aiming the wireless sender 40-1 towards the controlled apparatus 12-1. Once it is in alignment, releasing the SEND button initiates the sending. FIG. 12 shows this in graphical form, where on line BA the SEND switch is activated BAA for a period of time. When the switch is released BAB, the broken line BABB shows that this initiates the onset of the sending of the encoded signal BBA,BBB, BBC illustrated on line BB.

Figure 13:
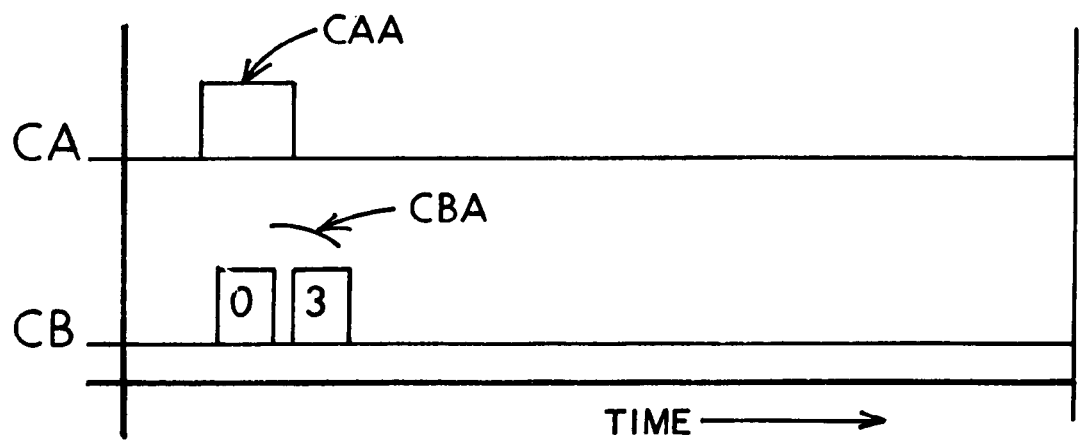
FIG. 13—A graph showing that a reassertion signal is sent to a televisor concurrent with actuation of a SEND keybutton.

I also show in FIG. 13 that the action CAA of a separate keybutton 6-1 may result in sending the interlink reaffirmation signal CBA (for example, Channel 03 or INPUT-1) to the televisor, thereby assuring necessitous televisor input selection.

Figure 14:
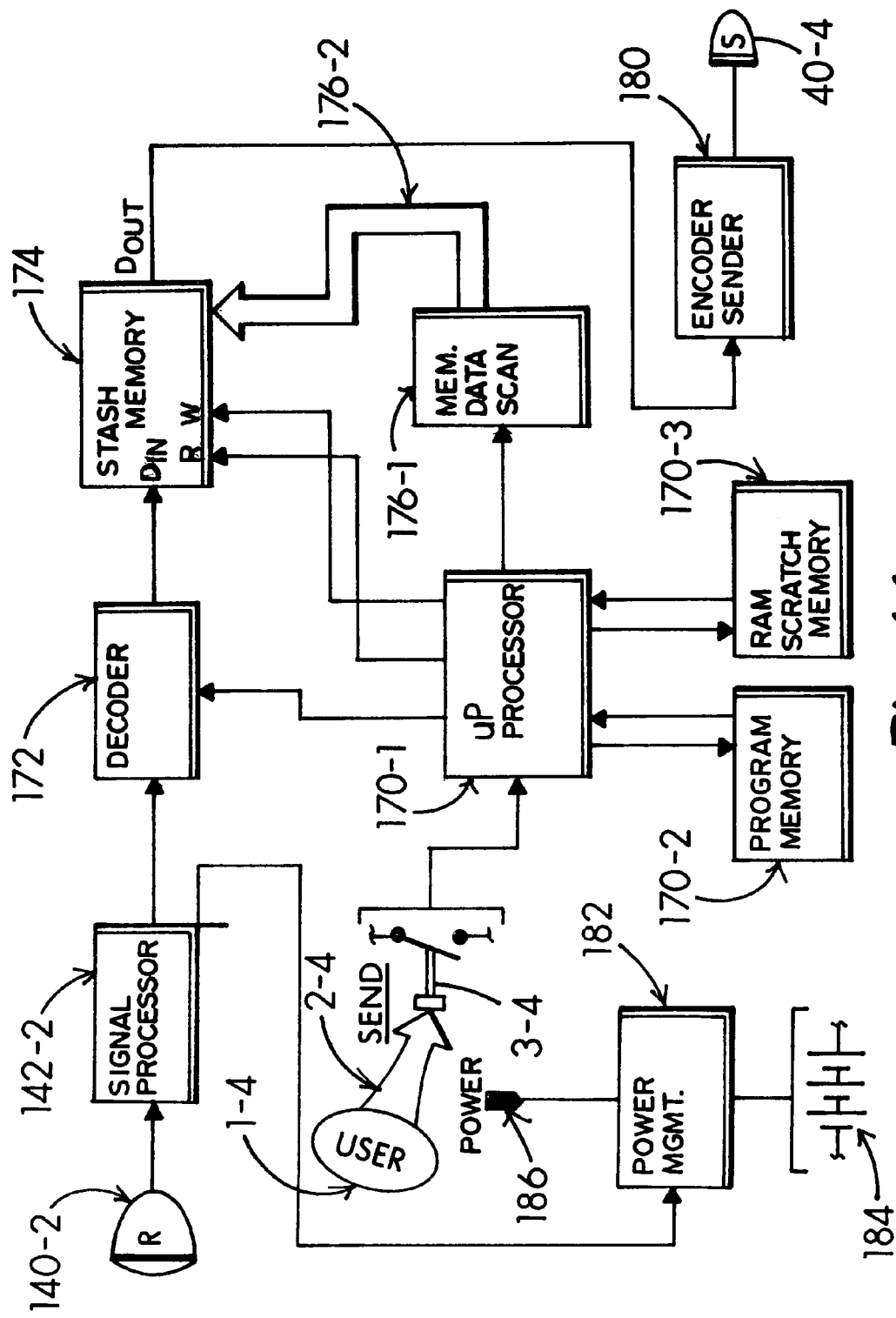
FIG. 14—Showing the use of a microprocessor for managing the STASH memory and associated functions.

A layout for an adapter suited for practicing my invention appears in FIG. 14 to include a receptor 140-2 tightly coupled 44-1 to an IRLED emitter on an adjunctive standard remote controller 20-2. The intercepted command data couples with a signal processor 142-2 followed by a decoder 172 which "decodes" the received command data in conjunction with a microprocessor 170-1 that in effect "runs the whole show". A suitable device 170-1 is a Microchip™ PICmicro or 80C52 microcontroller together with a program memory 170-2 and scratch RAM 170-3. The output of the decoder 172 provides command data which stores in a stash memory 174 for retention until a SEND command is initiated 2-4 by the user 1-4 using the SEND keybutton 3-4. The uP 170-1 causes the memory data scan 176-1 to readout the stash memory 174 and apply the content to an encoder/sender 180 for wireless coupling 40-4 with the controlled apparatus 12-1.

When a signal is accepted by the signal processor 142-2 it also routes a signal to the power management function 182 that promptly supplies power 186 the attendant circuitry from a battery 184 and shuts down when not needed, so as to conserve battery power.

Figure 15:
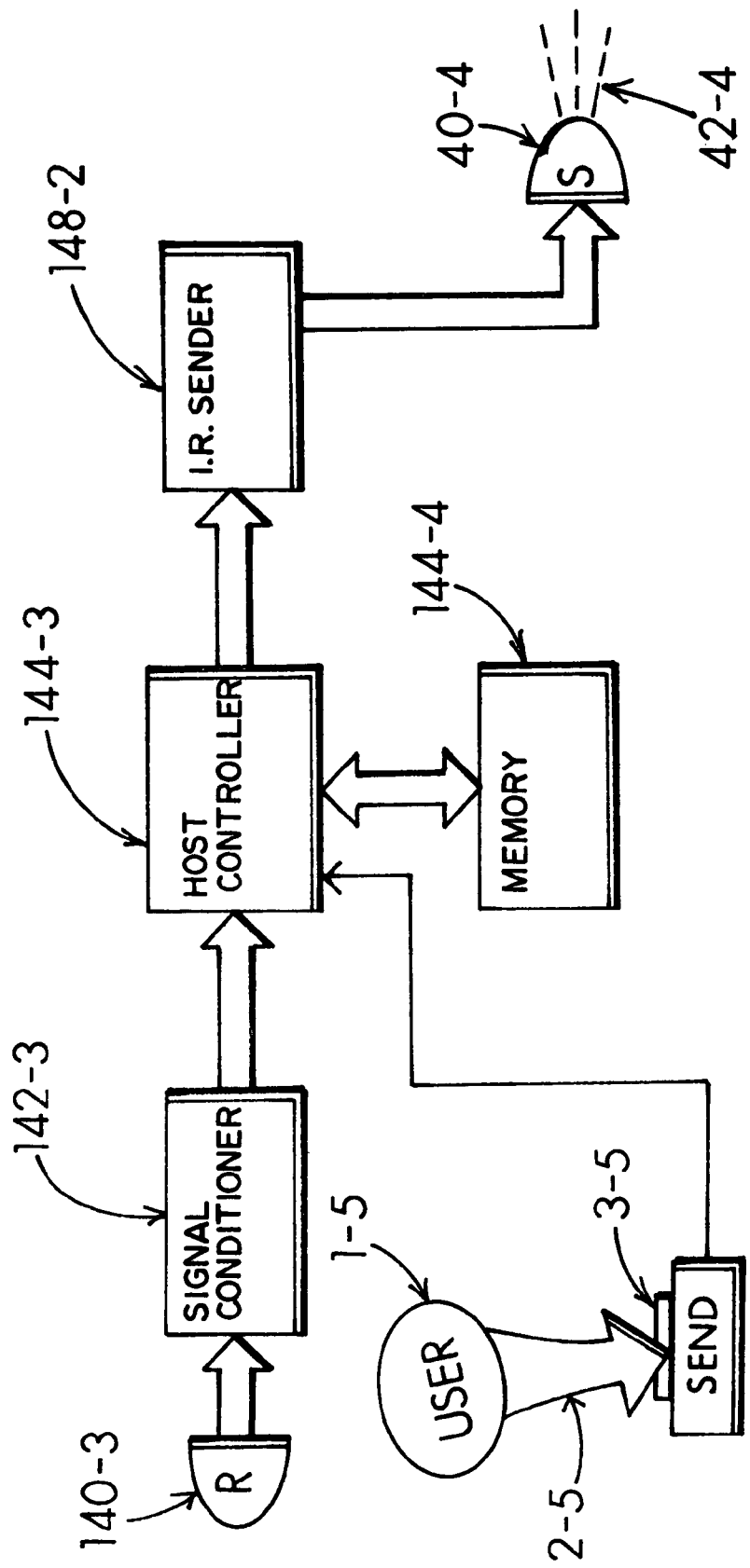
FIG. 15—A basic showing for the invention to have a host controller for storing the incoming commands and forwarding the stored commands when the SEND button is operated.
Figure 16:
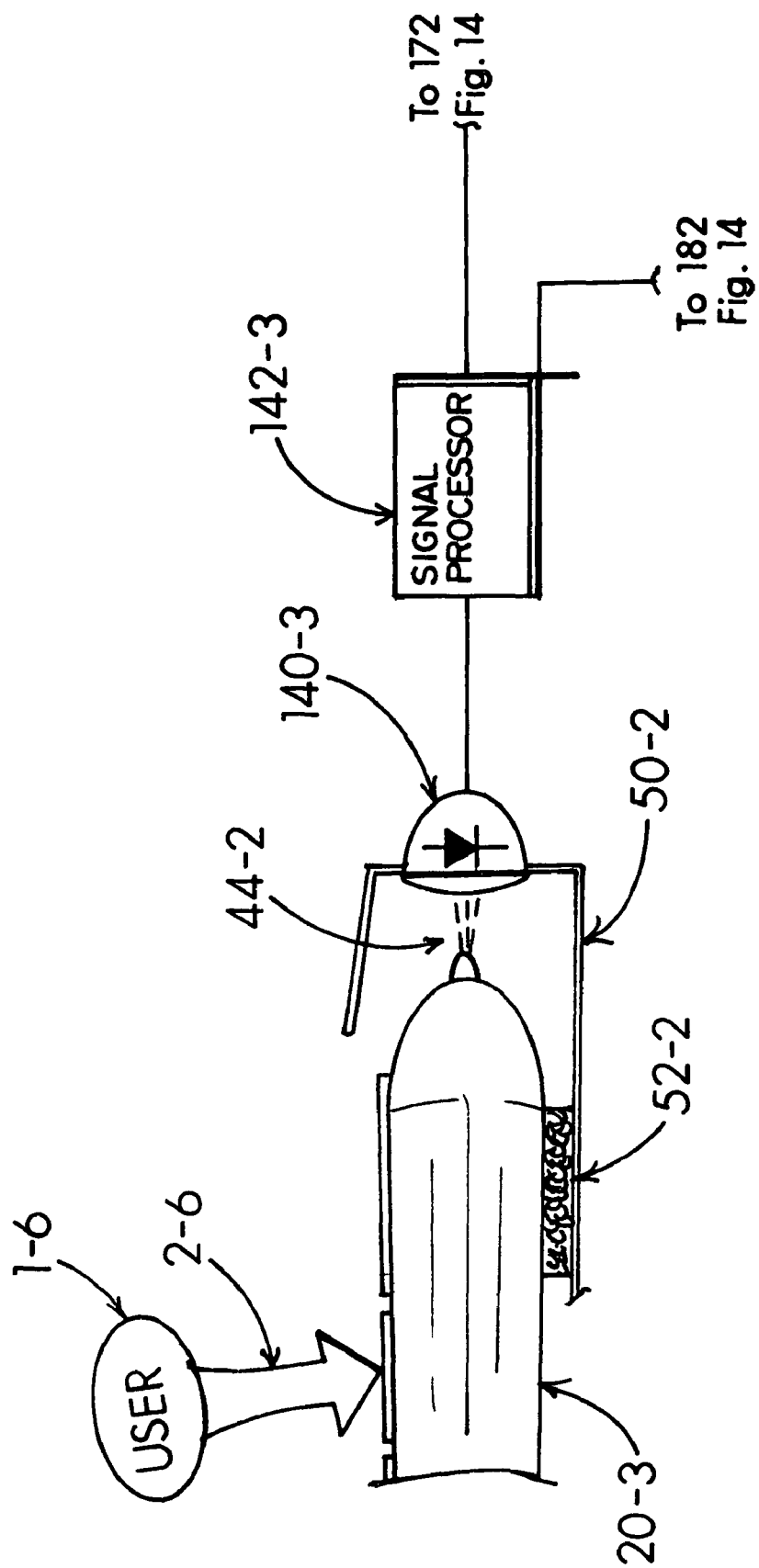
FIG. 16—A mechanical configurative view showing the preferred close-in coupling 44-2 between the ordinary remote controller 20-3 and the adapter 50-2.

A most basic illustrative exampling for my invention further appears in FIG. 15 to include a receptor 140-3 for linking wireless sendings 44-2 from an IRLED associated with a tightly coupled standard remote control 20-3 of FIG. 16. The receptor signals couple with a signal conditioner 142-3 for extracting command data from the incoming remote control sendings. A host controller 144-3 harbors the command data in a memory 144-4 for holding until the user 1-6 initiates 2-6 a SEND keybutton 3-5 located on the adapter 50-2. As a result of the SEND command, the host controller 144-3 reads-out the data stored in the memory 144-4 and routes it to an I.R. Sender 148-2 for driving an IRLED sender 40-4 thereby urging wireless translation 42-4 of the command data to the associated remotely controlled apparatus 12-1. The arrangement of FIG. 16 also shows the adapter 50-2 to be snugly affixed to the standard remote control 20-3 by hook and loop fastener strips such as Velcro™ or an equivalent attachment.

Figure 17:
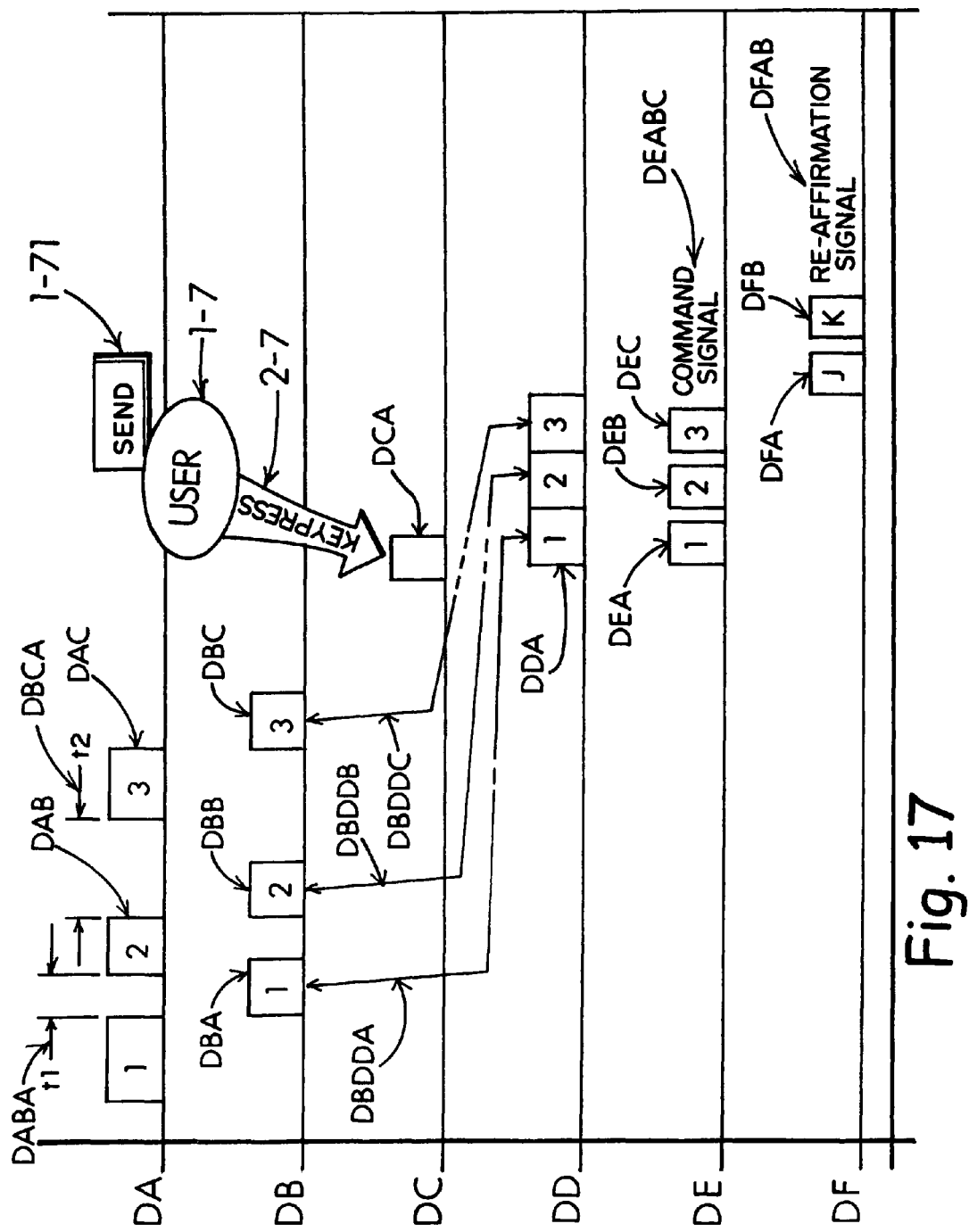
FIG. 17—A graphical showing of a leisurely entry of keybutton entries, subsequential storage, with SEND entry retrieval and resending of the command signal along with a re-affirmation signal assuring compatible hookup interchange between the remotely controlled apparatus.

My presentation of FIG. 17 explicitly shows the several cooperative efforts transpiring in the practice of my invention. Keybutton entries on the standard remote controller appear on line DA to include key entries DAA(1), DAB(2) and DAC(3). More importantly shown is the unimportance of time variation between each of the entries. In other words, the time lapse between the entry DAA and DAB represented as DABA may be considerably less than the time difference DBCA between the second entry DAB and the last entry DAC. These differences in keybutton entered sendings can be in terms of seconds, minutes or even longer. The resultant entries are received by my adapter as shown on line DB to include the command signals DBA(1), DBB(2) and DBC(3) that convey to a stash memory as depicted on line DD for consecutive, time-adjacent storage DDA(123). When the user 1-7 decides 1-71 to enter 2-7 a SEND command as shown DCA on line DC, a readout of the memory stored data DDA promptly commences. The readout delivers a strident command signal DEABC wherein each of the component command elements DEA,DEB,DEC are routinely equispaced to provide a rapid-fire delivery of the overall command signal to the wireless coupled remotely controlled apparatus. I also show that upon sending the command signal DEABC, a re-affirmation signal DFAB is also sent. This includes component commands DFA (J) and DFB(K) that might result in assuring a televisor setting on Channel 03 or Input-1, for mere example.

Figure 18:
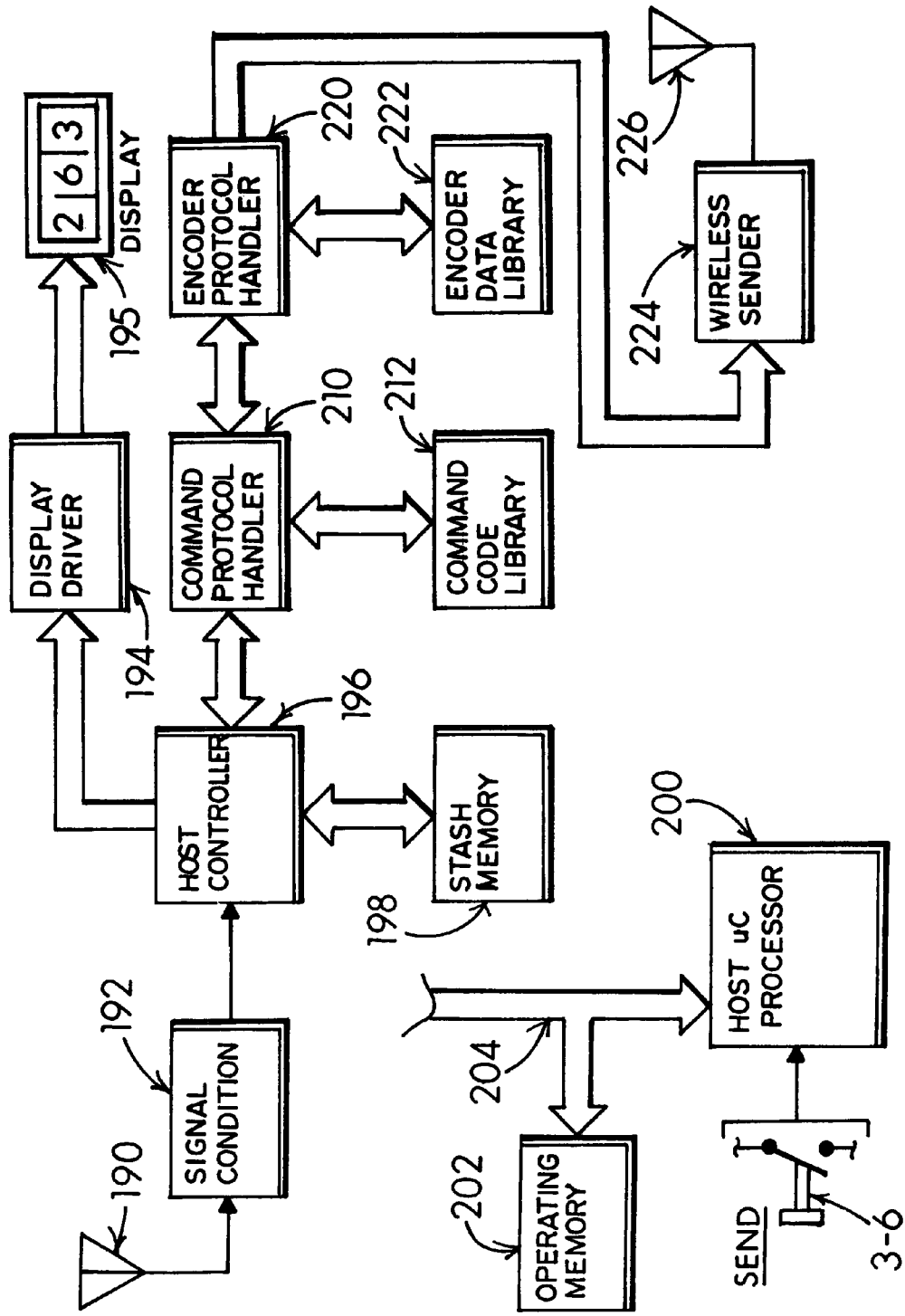
FIG. 18—A wireless remote control utilizing radio-frequency linkage and including command code composure and translation code composure with a visual display for convenience.

Realizing that some contemporaneous wireless remote controls utilize radio frequency coupling, I now depict an antenna 190 for recepting a wireless signal in FIG. 18, coupled to a receiver or signal conditioner 192 providing a command data output to a host controller 196. The recovered command data is temporarily stored in a stash memory 198 as entries are submitted by a user of the associated standard remote control. A display 196 may be utilized in conjunction with a display driver 194 to show the entries as they are made. In this illustrative example, the display 196 shows a channel number selection of "263" having been entered by the user.

Once the entry sequence is concluded, the user may actuate the SEND keybutton 3-6 that couples with a host uComputer 200 (Freescale Semiconductor M68HC908 device family, for example) that intercouples with other elements of this FIG. 18 showing via a data bus 204, including an operating memory 202. The SEND keybutton actuation urges the host processor 200 into commanding the host controller to retrieve the command data having been stored in the stash memory 198 and routing it to a command protocol handler 210.

I recognize that wireless radio-frequency control differs from infra red wireless coupling in that the r.f. signal may leak around the adapter and cause interaction with the associated remotely controlled apparatus. My invention intends to defeat this issue by accepting incoming commands from the standard remote controller that are ignored if applied directly to the remotely controlled apparatus 12-1. Meanwhile, my adapter utilizes the command protocol handler 210 and a command code library 212 to provide a protocol handler encoder 220 utilizing an encoder data library 222 to develop a diacritical signal interpreting the same commands as received from the standard remote controller. The encoder 220 output is professed as a uniquely encoded signal coupled to the wireless sender 224 and radiating antenna, for coupling with the remotely controlled apparatus 12-1 or the like. The result of this combination of elements is to accept an incoming wireless signal with a set of commands (such as channel-change numbers) to which the remotely controlled apparatus is blind and revamping their command signature into an alternate wireless signal readily recognizable to the remotely controlled apparatus.

Figure 19:
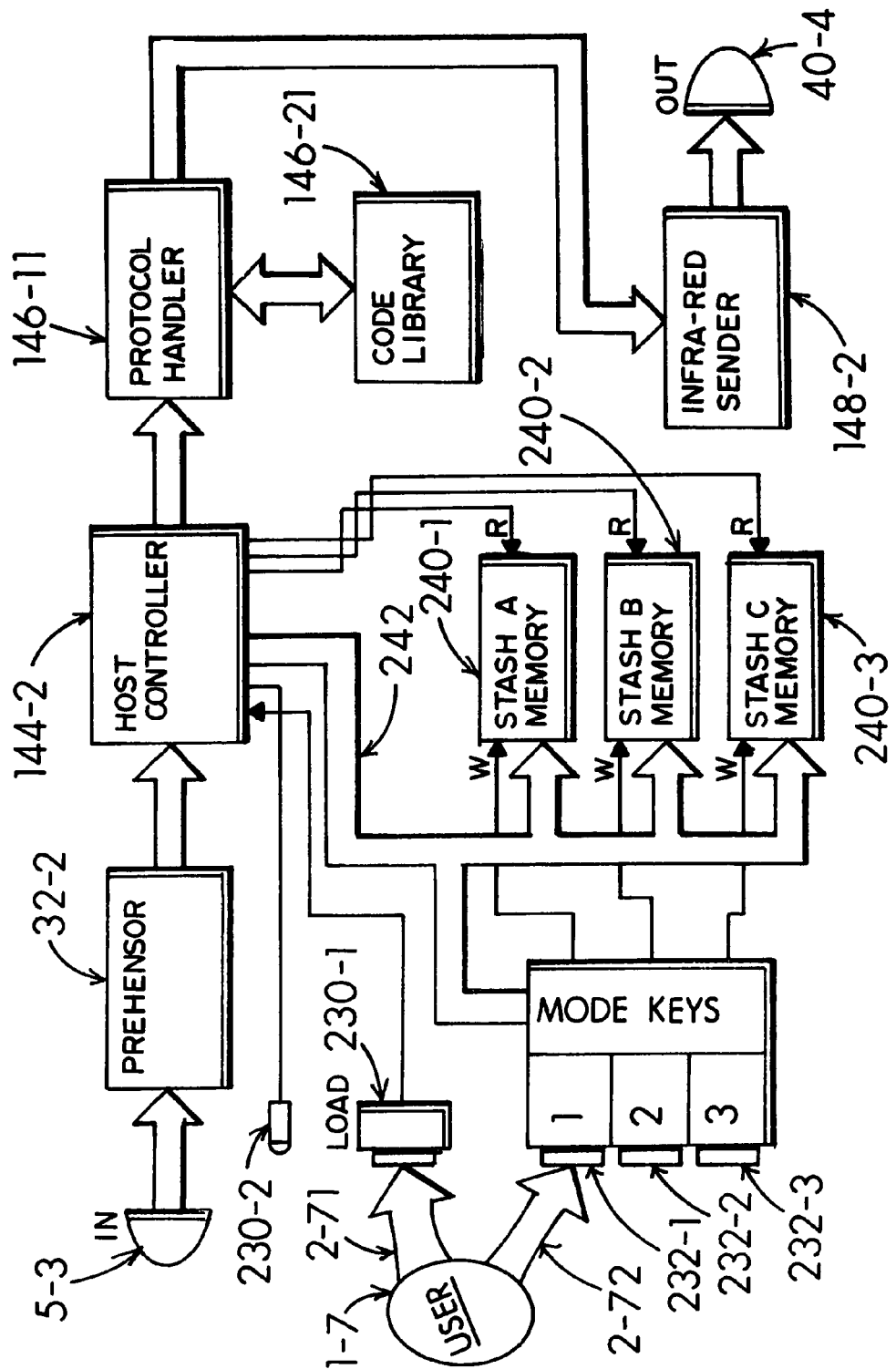
FIG. 19—My proxy adapter allowing pre-entry of several channel number selections into separate stash memory cells which may be later recalled and forwarded to the remotely controlled apparatus.

FIG. 19 shows an embodiment for my invention that affords a storing of several channel-change selections ahead of time. In other words, a user may be able to load-up two or more channel selection choices and then by merely pressing one designated SEND button, the channel change is immediately brought about with no last-minute fumbling with keys, aiming alignment and so forth. A standard remote controller couples with the prehensor 32-2 through the IR receptor 5-3 as earlier said with FIG. 5. The user 1-7 actuates the LOAD keybutton 230-1, which may be a toggled switch function, ONE-PRESS "ON", ONE-PRESS "OFF" wherein the toggle action may be either mechanically inherent with the keybutton 230-1 or else electronic as managed by the host controller's software. As observed in FIG. 19 a telltale lamp 232-2 may indicate the toggle status to the user. While the load is toggled-ON, one of the three (illustratively shown) MODE keys may be actuated. Understand that while the LOAD status is toggled ON, the MODE keys also operate in a toggle mode wherein a press of MODE keybutton 232-1 locks the MODE 1 key "ON" and enables the W (write) input of a stash A memory 240-1. While this MODE 1 condition is established, the user 1-7 may enter channel number selections into the adjunctive remote control's keypad. The numeric selections will be stored in the STASH A memory 240-1. Consider that by pressing the MODE 2 key 232-2, the stash B memory 240-2 is write-enabled and another channel number selection may be stored. Similarly, when the MODE 3 key 232-3 is pressed, the stash C memory 240-3 is write enabled and a third choice of channel number selection may be entered. Realize further that the MODE KEY selections 232-1,232-2, 232-3 are mutually exclusive: the most recently pressed key is the active MODE. As a result, a two digit channel number selection setup entry is completed merely by pressing another mode key or else by disengaging the LOAD toggle mode. Later on, when the actual stored channel numbers are sought, the user may aim the adapter towards the remotely controlled apparatus and merely press one of the three-shown MODE keys, presently functioning as SEND keys described earlier with the send key 3-3 of FIG. 5. The result is the host controller reads-out the stash memory contents associated with whichever one of the MODE keys is actuated as a virtual SEND keybutton. For example, pressing MODE keybutton 1 enables the stash memory 240-1 contents to be read-out and coupled with a protocol handler 146-11 that in conjunction with a code library 146-21 prepares a command encoded signal for the infra-red sender 148-2 to couple via a IRLED 40-4 with a remotely controlled apparatus 10-3 of FIG. 5.

Practice Caveats

A reasonable and comprehensive effort has been made to explain this invention in a manner which enables a person of quite ordinary skill in the art to efficiently duplicate my findings. The utter essence of my invention is to provide an accessory adapter for use with a standard and quite ordinary remote controller to provide a better operating experience for the user. My invention is attuned to the needs of elderly, physically or mentally challenged, technophobic and other users of remotely controlled television systems (such as televisors and home theater systems). The invention particularly accommodates slow entry of keybutton selections that may cause an ordinary setup to prematurely time-out, before the user has completed a selection sequence (such as a 3 digit channel number). My invention also intends to release the user from the demand that the remote control MUST be aimed at the remotely controlled apparatus all the while during which time the keybutton entries are submitted. It is a further intent that the invention involves the embodiment of an adapter that may affix to a standard remote control and coact in harmony with that remote control to attain the claimed advantages of the invention.

I fully expect that a skilled artisan may develop alternate details for my invention's adaptive implementation including a considerable variation regarding physical form details, electronic data-signal inter-coupling, intercoupling interface, instruction set software and firmware configuration and obvious operational preferences. I say that these variants naturally occur as an obvious outspread from the invention's central novelty and practicable examples. Such variants result from mere applied engineering skill coupled with an ever-increasing plethora of options regarding componental elements, techniques and programming skills which may be utilized to presently duplicate my invention's contribution to the art-field.

Any plagiaristic attempt by another to circumvent the essence of my invention to utilize a standard remote control in direct relation with my intercalated invention and to deliver a reconstituted command signal to a remote apparatus shall be prudently viewed with caution and suspicion. I realize that hindsight cleverness abounds and may suggest other physical and technical embodiments exhibiting a difference in physical arrangement and operational detail from that which I specifically depict. Such alternatives to my central teachings are likely to become readily apparent to and subsequently tried by others as a result of the conception delivered by my teaching. As a consequence to this realization, all technical hookup, signal processing and physical embodiment variations irrespective of their extent are to be construed as mere natural and obvious extensions of my central teachings, insofar as they satisfy the described functionality intent of my invention. In particular this includes the interception of wireless commands emanating from a standard remote control, collecting and storing the commands and reconstituting and collectively resending the commands to a remotely controlled apparatus, such as a televisor, by merely actuating a SEND function entry provision.

In particular this includes consolidating the full-function keyboard and GUI display as a unitized monopackage configuration. Any scheme which satisfies this objective of my invention shall be found as merely obvious modifications of or extensions to the rudiments of my invention's fundamental teachings. Obvious engineering refinements, embodiment practices and operational details shall be construed to be irrefutably within the scope of my invention as presently taught and inclusively claimed.

I claim for my invention:

1. A remote control operational enhancement method utilizing a coactive proxy adapter, comprising steps of:
   conjoining the adapter and a standard remote controller;
   manually submitting a sequence of distinct keybutton entries into the standard remote controller;
   urging the adapter to intercept and first store an ensuing sequence of several wireless data signals emitted by the standard remote controller's wireless sender; and,
   manually actuating a single "SEND" keybutton embraced by the adapter to resend the first stored sequence of several data signals as a composite emission originated from the adapter's emitter;
   whereby, a user may complete the manual entry of several distinctive keystroke selections prior to wireless linking of the conjoined remote controller and adapter with a remotely controlled apparatus, while an actuation of a singularly designated "SEND" keybutton may urge sending the first stored content as a composite wireless translation faithfully conveying the manually submitted sequence of distinctive keybutton entries to the remotely controlled apparatus.

2. The method of claim 1 comprising:
   configuring the adapter as a docking station;
   conjoining the docking station and the standard remote controller to urge a synergetic operational unification;
   rendering the sequence of several wireless data signals emitted by the standard remote controller to be promptly captured by the adapter and retained in a first storage; and,
   facilitating the user to manually urge the "SEND" keybutton to initiate a retrieval and composite rapid-fire resending of the first stored data signal sequence concurrent with the user's alignment of the adapter's emitter and a receptor associated with the remotely controlled apparatus;
   whereby, the user may leisurely enter the distinctive keybutton selections which are retentively stored, then read-out and repeatably re-sent to the remotely controlled apparatus in a metered sequence.

3. The adjunctive remote control adapter of claim 1 comprising:
   the proximate emplacement of the adapter and the standard remote controller are conjoined by:
   establishing the adapter as a docking station; and,
   affixing the docking station to the standard remote controller as an accessorial appurtenance;
   whereby the conjoinment results in a unitary controller having all the command functions of the standard remote controller combined with the advantages of storing the commands and enabling the user to directly send a consolidated sequence of wireless commands by singularly actuating the "SEND" key-button.

4. The method of claim 3 comprising:
   operating a secondarily designated "SEND" keybutton embraced by the adapter to initiate at least one of the following modes:
   a first mode converting a virtual channel number entry into a real channel number before resending the composite emission;
   a second mode converting a virtual channel number entry into a surrogate channel number before resending the composite emission; and,
   a third mode converting an alphanumeric weighted entry into one of a real and a surrogate channel number before resending the composite emission;
   whereby a user may select a mode state for conversion of the manual keybutton entries into a mutually compatible command signal intended for the remotely controlled apparatus.

5. The method of claim 3 comprising:
   a code changer for adapting the first encoded signal format delivered by the remote controller and intercepted by the docking station into a second encoded signal format for subsequential resending to the remotely controlled apparatus; and,
   whereby the first encoded signal format may be converted in the second encoded signal format to be compatible with the remotely controlled apparatus.

6. The method of claim 1 comprising:
   processing value of the stored data sequence into an alternate data value sequence; and,
   weighting the composite emission sent by the adapter with the alternate data value sequence;
   whereby, entry of a real command number selection may result in a sending of a virtual command number selection to the remotely controlled apparatus.

7. The method of claim 1 comprising;
   ascribing channel number values to the manual keybutton entries; and, converting the ascribed channel number values representing an over-the-air channel number into a surrogated channel number precedent to the subsequential sending as the composite emission;

whereby in a CATV, cable or satellite delivery system the over-the-air channel number content may be re-assigned a surrogate channel number and the adapter may automatically compensate for this re-assignment by sending the surrogate channel number command in substitution for the over-the-air channel number selection entered by a user.

8. The method of claim 1 comprising:
configurating the remotely controlled apparatus as a television signal receptor;
overlaying the standard remote controller's usual numerical keypad with an alternate visage providing an alphanumerical redefinition of the keypad;
submitting the actuation of the sequence of manual keybutton entries as alphameric selections representative of a program provider's acronym; and,
converting a first stored sequence of the alphameric selections into a channel number equivalent precedent to the subsequential sending as the composite emission;
whereby in a CATV, cable or satellite delivery system the channel number equivalent may represent one of a real channel number and a surrogate channel number recognized for reception from the delivery system by the television signal receptor.

9. The method of claim 1 further comprising:
configurating the remotely controlled apparatus as one of a television receiver, a VCR, DVR, a cable box, a satellite receiver and a home theater system;
an option urging the adapter to produce at least two of a plurality of operational modes selected from:
  a first mode whereby the manual keybutton entries define the resulting selfsame value of the subsequentially sent composite emission;
  a second mode whereby the manual keybutton entries usually represent over-the-air channel numbers which are permuted into surrogate channel numbers for the subsequentially sent composite emission;
  a third mode whereby the standard remote controller's usually numerical keypad is overlaid with an alternate visage providing an alphanumerical redefinition of the keypad enabling the manual keybutton entry of an alphameric acronym representing a program provider's appellation that converts into a real over-the-air channel number for the subsequentially sent composite emission; and,
a fourth mode whereby the standard remote controller's usually numerical keypad is overlaid with an alternate visage providing an alphanumerical redefinition of the keypad enabling the manual keybutton entry of an alphameric acronym representing a program provider's appellation that converts into a surrogated channel number for the subsequentially sent composite emission.

10. The method of claim 1 further comprising:
the actuation of the singularly designated "SEND" keybutton is intently maintained; and,
delaying a sending of the composite emission of the stored sequence of the several data signals until a release of the intently maintained "SEND" keybutton occurs;
whereby an occurrence of a finite time lapse is allowed to enable the user to leisurely orient the manual linkage of the adapter with the remotely controlled apparatus prior to commencing the sending of the several data signals.

11. The method of claim 1 comprising:
configuring the remotely controlled apparatus as a television signal receptor intercoupled with a televisor;
second storing a preset selection of ancillary data values representing necessitous input selection setting for the associated televisor; and,
collectively sending the first stored sequence of the several data signals to include sending the ancillary data values;
whereby, the televisor's input selection setting is confirmedly established.

12. The method of claim 1 comprising:
first encoding the intercepted wireless data signals originative from the standard remote controller with commands originated by the manual keybutton entries;
recoding the signal sent by the adapter into a second data signal encodement with substantially equivalent commands; and,
sending the second data signal encodement as the composite wireless translation in response to the actuation of the "SEND" keybutton;
whereby, code-switching of the first encoded data signal command obtained from the standard remote controller may be supplanted by the second encoded data signal having substantially the same command intent prior to the wireless translation to the remotely controlled apparatus.

13. A remote control complementary command method, comprising:
adjoining an ordinary remote controller and a portable docking facility;
conducting the remote controller to emit a succession of wireless data signals weighted by keystroke values entered by a user;
urging the portable docking facility to intercept and store the wireless data signals in a memory;
actuating a first "SEND" key subsequent to a completion of the plural sequence of user entries;
urging a consecutive readout of the intercepted data signals stored in the memory; and,
translating the readout of the intercepted data signals as a composite data signal consecution for interception by and command of a remotely controlled apparatus;
whereby the ordinary remote controller may be adapted by conjugation with the portable docking facility to allow a sequence of individual keystrokes to be casually entered and subsequently delivered as the composite command signal consecution upon user actuation of a singularly designated first "SEND" key while the portable docking facility is manually aimed at the remotely controlled apparatus.

14. The method of claim 13, comprising:
overlaying the remote controller's keypad with an alphanumeric visage;
the plural sequence of keystroke values entered by the user are an emblematic acronym;
converting the intercepted data values representing the emblematic acronym into one of a real and a surrogate channel number to occur between the interception and the translation of the composite data package by the docking facility.

15. The method of claim 13, comprising:
accepting the user entry of the keystroke values as command signals denotative of at least one of:
  a. a real "over-the-air" television channel number;
  b. a virtual television channel number representing an "over-the-air" channel number;

c. a surrogate television channel number ordinarily assigned by a program provider to a number of proprietary television programming channels;

d. alphanumeric entries representative of a emblematic acronym;

adapting the accepted command signal entry into an encoded format appropriate for seeking the desired command result from the remotely controlled apparatus once the singularly designated "SEND" key is actuated and the translation of the composite data signal consecution is consummated;

whereby the docking facility may express capability for intercepting first command encoded wireless data signals from the ordinary remote controller and subsequently re-encoding them in a second command encodement necessitous for attaining desired command results from the remotely controlled apparatus.

16. The portable docking facility of claim 13 to comprise:

storing a code library for an extensive plurality of remotely controlled apparatus;

re-encoding the intercepted wireless data signals into an alternate encoding format derived from the code library;

sending the re-encoded wireless data signals for compatible interception by the remotely controlled apparatus;

whereby, the portable docking facility may include capability for re-encoding the intercepted wireless data signals into an encoded format compatible with the remotely controlled apparatus.

17. The method of claim 13 comprising:

asserting a reset of a televisor's primary video input to one of an "unused" channel and alternate input for intercoupling with a video source such as a cable box, satellite receiver and VCR/DVD player and equivalent;

initiating the reassertion by a reset sending method utilizing one of the steps of:

automatically sending the input selection signal to the televisor when the first "SEND" key is actuated;

separately actuating a second "SEND" key dedicated for sending the input selection signal independent from the sending of the input selection signal;

operating the first "SEND" key in two modes where a first actuation mode enables the sending of the composite command signal and a second actuation mode enables the sending of the input selection signal;

whereby, the televisor's primary video input or channel number selection may be re-asserted to overcome confusion that may otherwise occur when the composite command signal is sent to the remotely controlled apparatus and the televisor's input selection is maladjusted.

18. An adjunctive remote control adapter device, comprising:

an adaptive means affixable to a standard remote controller (SRC);

the SRC including a keypad means enabling user submission of a sequence of keybutton entry commands;

an interceptive means for primarily receiving wireless command data signals urged by the user submissions;

a data storage means for retention of the command data signals;

a "SEND" command means for initiating a read-out of the command data signals retained by the data storage means;

a translating means for wireless submission of the command data signals read-out from the data storage means; and, a remotely controlled apparatus receptive of and responsive to the command data signal's content;

whereby, a user may make a sequence of usual keystroke entries into a keypad on the SRC, whereupon the usual wireless signals emitted by the SRC are intercepted and temporally data-stored by the adaptive means and subsequently retrieved upon user actuation of the "SEND" command followed by a resending of the temporally stored data to the remotely controlled apparatus for a commanded response reflective of the sequence of keystroke entries urged through the keypad on the SRC.

19. The device of claim 18 comprising:

an augmentive indicia bearing overlay preempting the SRC's usual set of keybutton indicia;

the translating means including at least two operative modes, including:

transferring a stored command data signal as a rapid-fire sequence of command data signals weighted by the user submissions guided by the SRC's usual set of keybutton indicia;

the translating means effectually altering an initial value of a stored command data signal read-out from the data storage means into an alternate value of command data signal weighted by one of the SRC's usual set of keybutton indicia and otherwise guided by the augumentive indicia;

whereby the resulting command data signal sent to the remotely controlled apparatus is determined to represent at least one of:

a sequence of keybutton values initially entered by the user, a conversion of a real channel number user entry into a virtual channel number for the sending, a conversion of a virtual channel number into a real channel number for sending, and, a conversion of an acronymical sequence into one of a real channel number and a virtual channel number for sending.

20. The device of claim 18 comprising:

a supplementary sending means for conveying an input selection command usually to a televisor means to affirm a cooperative interlink selection between the televisor means and a video signal source means;

whereby the televisor input setting may be automatically affirmed as appropriate for coupling with an associated video signal source, that may include at least one of a cable box means, a satellite receiver means, a VCR/DVD/DVR means and a CATV means.

* * * * *